(12) United States Patent
Kanamori et al.

(10) Patent No.: US 7,948,622 B2
(45) Date of Patent: May 24, 2011

(54) SYSTEM, METHOD AND APPARATUS FOR IMAGE PROCESSING AND IMAGE FORMAT

(75) Inventors: Katsuhiro Kanamori, Nara (JP); Satoshi Sato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/846,941

(22) Filed: Jul. 30, 2010

(65) Prior Publication Data

US 2010/0290713 A1   Nov. 18, 2010

Related U.S. Application Data

(62) Division of application No. 12/294,317, filed as application No. PCT/JP2008/000186 on Feb. 8, 2008, now Pat. No. 7,792,367.

(30) Foreign Application Priority Data

Feb. 13, 2007   (JP) .................................. 2007-032409

(51) Int. Cl.
  *G01J 4/00*   (2006.01)
  *G06K 9/62*   (2006.01)
(52) U.S. Cl. ....................................... 356/364; 382/224
(58) Field of Classification Search .......... 356/364–370; 382/224–228
  See application file for complete search history.

(56) References Cited

U.S. PATENT DOCUMENTS

| 5,028,138 | A | * | 7/1991 | Wolff ............................ 356/369 |
| 7,136,217 | B2 | | 11/2006 | Kawakami et al. |
| 7,679,747 | B2 | * | 3/2010 | Kuwada ....................... 356/445 |
| 7,792,367 | B2 | * | 9/2010 | Kanamori et al. ............ 382/224 |
| 2002/0164061 | A1 | | 11/2002 | Paik et al. |
| 2010/0118398 | A1 | | 5/2010 | Grau |

FOREIGN PATENT DOCUMENTS

| DE | 10 2005 031 966 A1 | 1/2007 |
| JP | 11-211433 | 8/1999 |
| JP | 2002-024818 | 1/2002 |
| JP | 2003-091726 | 3/2003 |
| WO | 02/077588 A2 | 10/2002 |
| WO | 2006/049237 | 5/2006 |

OTHER PUBLICATIONS

International Search Report for corresponding Application No. PCT/JP2008/000186 dated May 13, 2008.

(Continued)

*Primary Examiner* — Vu Le
*Assistant Examiner* — Alex Liew
(74) *Attorney, Agent, or Firm* — Renner, Otto, Boisselle & Sklar, LLP

(57) ABSTRACT

According to the present invention, a polarized image is captured, a variation in its light intensity is approximated with a sinusoidal function, and then the object is spatially divided into a specular reflection area (S-area) and a diffuse reflection area (D-area) in Step S402 of dividing a reflection area. Information about the object's refractive index is entered in Step S405, thereby obtaining surface normals by mutually different techniques in Steps S406 and S407, respectively. Finally, in Steps S410 and S411, the two normals are matched to each other in the vicinity of the boundary between the S- and D-areas.

5 Claims, 32 Drawing Sheets

OTHER PUBLICATIONS

Lawrence B. Wolff et al., "Constraining Object Features Using a Polarization Reflectance Model"; IEEE Transactions on Pattern Analysis and Machine Intelligence; vol. 13, No. 7, Jul. 1991, pp. 635-657. (cited in [0016], p. 8 of the description).

T. Kawashima et al.; "Development of Polarization Imaging Device and Applications by Using Patterned Polarizer"; Institute of Electronics, Information and Communication Engineers of Japan, National Conference 2006; No. D-11-52, p. 52; Mar. 2006. (cited in [0017], p. 9 of the description).

Roger Y. Tsai; "An Efficient and Accurate Camera Calibration Technique for 3D Machine Vision", Proceedings of IEEE Conference on Computer Vision and Pattern Recognition; Miami Beach, FL; 1986, pp. 364-374. (cited in [0108], p. 59 of the description).

Takashi Sato et al.; Ellipsometry and Polarization Imaging Using an Array of Photonic Crystals, Material for Optomechatronics Symposium; SenSpec 2006; Latest Trends of Transparent Film Shape/Quality Measuring, Jun. 8 and Jun. 9, 2006; Expert Committee on Mechanophotonics (The Japan Society for Precision Engineering); pp. 45-52. (cited in [0155], p. 81 of the description). Including a concise explanation thereof.

Richard F. Lyon and Paul M. Hubel; "Eyeing the Camera: Into the Next Century"; IS & T/SID Tenth Color Imaging Conference; pp. 349-355; 2002. (cited in [0156], p. 81 of the description).

K. Kamimura et al.; "Super Resolution Method using Texton Substitution"; Bulletin of the Institute of Image Information and Television Engineers; vol. 60, No. 10; pp. 1655(1)-1657(3); 2006. (cited in [0168], p. 88 of the description).

K. Ikeuchi and K. Sato; "Determining Reflectance Properties of an Object Using Range and Brightness Images"; IEEE Transactions on Pattern Analysis and Machine Intelligence; vol. 13, No. 11, pp. 1139-1153; 1991. (cited in [0171], p. 89 of the description).

Atkinson et al.; "Recovery of Surface Orientation from Diffuse Polarization"; IEEE Transactions on Image Processing; vol. 15, No. 6; Jun. 2006; pp. 1653-1664.

Atkinson et al.; "Shape Estimation Using Polarization and Shading from Two Views"; IEEE Transactions on Pattern Analysis and Machine Intelligence; vol. 29, No. 11, Nov. 2007; pp. 2001-2017.

Co-pending U.S. Appl. No. 12/294,317, filed on Sep. 24, 2008 (allowed claims provided).

European Search Report for corresponding European Application No. 08710340.4 dated Nov. 3, 2010.

European Search Report for corresponding European Application No. 10000175.9 dated Nov. 3, 2010.

Miyazaki et al., "Polarization-based Inverse Rendering from a Single View", Oct. 13, 2003, Proceedings of the Eight IEEE International Conference on Computer Vision, Nice France; Oct. 13-16, 2003, International Conference on Computer Vision, Los Alamitos, CA, IEEE Comp. Soc., US, pp. 982-987, vol. 2, XP031213153; ISBN: 978-0-7695-1950-0.

Hara et al., "Determining Reflectance and Light Position from a Single Image Without Distant Illumination Assumption", Oct. 13, 2003, Proceedings of the Eight IEEE International Conference on Computer Vision, Nice France; Oct. 13-16, 2003, International Conference on Computer Vision, Los Alamitos, CA, IEEE Comp. Soc., US, pp. 560-567, vol. 1, XP031213097, ISBN: 978-0-76951950-0.

Osadchy et al., "Using Specularities for Recognition", Oct. 13, 2003, Proceedings of the Eight IEEE International Conference on Computer Vision, Nice France; Oct. 13-16, 2003, International Conference on Computer Vision, Los Alamitos, CA, IEEE Comp. Soc., US, pp. 1512-1519, vol. 2, XP031213221, ISBN: 978-0-7695-1950-0.

Ota Shinichi et al., "Development of a Polarization Imaging Device Using a Patterned Polarizer and Its Application", IEIC Technical Report, vol. 106, No. 317, Oct. 2006, pp. 85-90, XP001525604, ISSN: 0913-5685.

\* cited by examiner (a)

(b)

Ψ=0°

Ψ=90°

Ψ=45°

Ψ=135°

Ψ'(x,y)

θ'(x,y)

Id(x,y)

Is(x,y)

(a)

(b)　　　(c)

(2)

(a)

(b)

SYSTEM, METHOD AND APPARATUS FOR IMAGE PROCESSING AND IMAGE FORMAT

This application is a divisional of U.S. patent application Ser. No. 12/294,317 filed on Sep. 24, 2008 now U.S. Pat. No. 7,792,367, which is a §371(c) of International Application No. PCT/JP2008/000186, filed Feb. 8, 2008, and also claims priority to Japanese Application No. 2007-032409 filed on Feb. 13, 2007, which is hereby incorporated herein by reference in its entirety.

TECHNICAL FIELD

The present invention relates to an image processing method and apparatus for reconstructing the surface shape of an object based on a polarized image thereof, and more particularly relates to an image processing technique that can collect information about the shape of the object or about a light source used in a shooting scene.

BACKGROUND ART

It is expected that cellphones with a camera, digital cameras, digital movie cameras and other imaging devices would achieve as high definition as an HDTV in the near future. Meanwhile, people are trying to reduce the sizes of those devices as much as possible in order to further increase their additional values. However, if the size of an optical system or an image capture device were reduced significantly, then the basic performance of the imaging device would decline too much to maintain the minimum required level in terms of sensitivity or diffraction limit of lens. For that reason, such a high-resolution trend should hit a plateau sooner or later.

However, even when the high-resolution trend hits a plateau, the image quality can still be improved by adding numerous pieces of information about various physical properties, which can be used to generate an image with the aid of computer graphics, to the image information of the object itself. Nevertheless, for that purpose, the amount of information to collect is far too much to handle with conventional two-dimensional image processing. This is because pieces of physical information, including information about the three-dimensional shape of the object information about the light source to illuminate the object, need to be obtained during the image generation process.

To obtain information about the shape of the object by a conventional technique, an active sensor for projecting either a laser beam or a light beam emitted from an LED onto the object or a rangefinder system such as a differential stereo vision system is needed. However, such a sensor or system is not just bulky but also allows a distance of at most several meters between the camera and the object. Besides, such a sensor or system cannot be used unless the object is a solid and bright diffusive object. Under such a restriction, the sensor or system cannot be used to shoot an object located at a distance outdoors (e.g., on a field day) or take a close up photo of a person with his or her hair and clothes shot as beautifully as possible.

To obtain shape information about a completely passive object to be shot either outdoors or in a normal shooting environment, polarization may be used according to some technique. Patent Document No. 1 discloses a method for monitoring specular reflection components with a polarizer, which is arranged front of the lens of a camera, rotated. According to this method, the local normal information about the object can be obtained even without making any special assumption about the light source to illuminate the object (i.e., which may be either randomly polarized light or non-polarized light).

A normal to the surface of an object has two degrees of freedom. The surface normal is included in an incident plane including an incoming light ray and a reflected light ray. Hereinafter, this point will be described.

As shown in FIG. 31(a), a light ray that has come from a light source and reached an observation point is reflected from the observation point and then reaches the camera's focus position (which defines an imaging viewpoint). The angle $\theta s$ defined between the incoming light ray and a surface normal at the observation point is the angle of incidence. In cases of specular reflection, the angle defined between the light ray reflected and emerging from the observation point (i.e., outgoing light ray) and the surface normal at the observation point (i.e., the angle of emittance) is equal to the angle of incidence $\theta s$. On the other hand, in cases of diffuse reflection, irrespective of the location of the light source or the angle of incidence, the angle defined between the outgoing light ray and the surface normal at the observation point is always defined as the angle of emittance as shown in FIG. 31(b).

The incoming light ray, the surface normal and the outgoing light ray shown in FIG. 31(a) are all included in a single plane, which will be referred to herein as an "incident plane". On the other hand, the surface normal and the outgoing light ray shown in FIG. 31(b) are also included in a single plane, which will be referred to herein as an "emittance plane".

FIGS. 32(a) and 32(b) schematically illustrate two incident planes 20 on which the surface normal 12 has mutually different directions. Each of these incident planes 20 includes an incoming light ray 10a, an outgoing light ray 10b and the surface normal 12. In these two incident planes 20 illustrated in FIG. 32, the two directions of the surface normal at the observation point define an angle $\Psi$ between them. That is to say, the surface normal on one of these two planes has rotated from the counterpart on the other plane by the angle $\Psi$ around the optical axis of the outgoing light ray.

If the angle $\Psi$ that defines the incident plane 20 and the angle of incidence $\theta s$ on the incident plane 20 are both known, then the surface normal 12 can be determined. In other words, to determine the surface normal 12, both of these two angles $\Psi$ and $\theta s$ need to be obtained (i.e., the degree of freedom is two). The same statement also applies to the diffuse reflection. That is to say, if the angle $\Psi$ that defines the emittance plane and the angle of emittance $\theta d$ on the emittance plane are both known, the surface normal can be determined.

Hereinafter, it will be described how to determine the surface normal on a region where specular reflection is produced. Among the two degrees of freedom described above, the angle $\Psi$ that defines the incident plane may be determined to be an angle at which the light intensity, varying with the rotation of the polarizer, becomes minimum. On the other hand, if the material of the object is known, the angle of incidence $\theta s$ can be estimated based on a PFR (polarization Fresnel ratio) value, which is a quantity correlated to the amplitude of transmitted radiance (or light intensity) when the polarizer is rotated. This is because there is a certain relation between the PFR value and the angle of incidence as will be described later.

However, to obtain the PFR value of specular reflection, the diffuse reflection component and the specular reflection component need to be accurately separated from each other at a single point on the object. Also, as long as a single camera is used, two angles of incidence $\theta s$ are obtained as two different solutions from the PFR value. That is to say, a unique angle of incidence θs cannot be obtained.

Patent Document No. 1 discloses a technique for estimating the PFR value and the diffuse reflection component Id of light intensity at the same time by observing the maximum and minimum values Imax and Imin of the light intensity. According to this technique, however, unless statistical processing is carried out on a group of a lot of pixels that have the same specular reflection property but significantly different light intensities or gray scales, a huge error will be produced. For that reason, the technique disclosed in Patent Document No. 1 cannot be applied generally to a specular reflection area, which is usually present just locally.

Patent Document No. 2 discloses a technique for determining a surface normal by measuring the polarization component of light that has been regularly reflected from a transparent object with a known refractive index. More specifically, the incident plane is determined by the minimum value of the polarization component of regularly reflected light and then (Imax−Imin)/(Imax+Imin), which corresponds to the PFR value, is calculated. The angle of incidence θs is also determined based on (Imax−Imin)/(Imax+Imin), thereby obtaining the surface normal.

According to Patent Document No. 2, however, the object must be a transparent object that produces only specular reflection. Also, since the specular reflection is supposed to be produced globally on the object, the object should be surrounded with a special diffuse illumination system. That is why the method disclosed in Patent Document No. 2 cannot be applied to shooting a normal outdoor scene.

Meanwhile, Non-Patent Document No. 1, which is written by the inventors of Patent Document No. 1, takes the polarization phenomena of not only specular reflection but also diffuse reflection into consideration and discloses their own theoretical formulation. However, Non-Patent Document No. 1 just applies that formulation to classifying image edges and neither teaches nor suggests the possibility of applying that formulation to determining the surface normal.

Non-Patent Document No. 2 discloses a special type of image sensor for obtaining light intensity information and polarization information at the same time without rotating the polarizer. Non-Patent Document No. 2 says that they carried out a demonstrating experiment for obtaining normal information (representing the curves of a car body, for example) in an outdoor scene based on the polarization intensities in four directions by performing real time processing using that special type of image sensor. If such an image sensor were introduced into a camera, polarization information could certainly be obtained as a moving picture. But Non-Patent Document No. 2 does not disclose the details of algorithm to be actually used in figuring out a normal based on the polarization information.

Patent Document No. 1: U.S. Pat. No. 5,028,138.
Patent Document No. 2: Japanese Patent Application Laid-Open Publication No. 11-211433
Non-Patent Document No. 1: Lawrence B. Wolff et al., "Constraining Object Features Using a Polarization Reflectance Model", IEEE Transaction on Pattern Analysis and Machine Intelligence, Vol. 13, No. 7, July 1991
Non-Patent Document No. 2: Kawashima, Sato, Kawakami, Nagashima, Ota and Aoki, "Development of Polarization Imaging Device and Applications by Using Patterned Polarizer", Institute of Electronics, Information and Communication Engineers of Japan, National Conference 2006, No. D-11-52, p. 52, March 2006.

DISCLOSURE OF INVENTION

Problems to be Solved by the Invention

However, nobody has ever proposed an extensively applicable method for obtaining shape information of an object using a polarized image. More specifically, the prior art has the following problems.

1) According to the conventional technique that uses polarization information obtained by specular reflection (i.e., mirror reflection), the mirror reflection is produced just locally under a normal light source, and therefore, the normal cannot be determined over a wide range of the object.

2) If a normal to the object is obtained based on the angle of incidence, specular reflection and diffuse reflection should be separated from each other to accurately Calculate the PFR value correlated to the amplitude of the light intensity. Actually, however, it is difficult to separate these two types of reflection from each other. Also, even if one tried to determine the angle of incidence by the theoretical equation that should be satisfied between the PFR value and angle of incidence, the angle could not be obtained as a single solution.

In order to overcome the problems described above, the present invention has an object of providing, first and foremost, an image processing method and apparatus that can obtain shape information of an object at an actual scene based on a polarized image thereof.

Another object of the present invention is to provide an image input device and method that can obtain light intensity information, including specular reflection and diffuse reflection components that have been separated from each other, light source information and so on, which are needed when an image captured is subjected to computer graphics processing.

Means for Solving the Problems

An image processing system according to the present invention includes: an image capturing section for obtaining polarized images; an image processing section for generating an image format by processing a plurality of polarized images that have been obtained by the image capturing section, the image format including, as data, a specular reflected image and a diffuse reflected image of an object, surface normal information at respective pixel locations on the object, and light source information obtained at the object's position; and a high-resolution image reproducing section for reconstructing object's shape by processing and synthesizing together the specular reflected and diffuse reflected images of the object using the image format.

In one preferred embodiment, the image processing section performs the steps of: dividing each said polarized image into a plurality of areas with different reflection properties including a specular reflection area and a diffuse reflection area; getting information about the refractive index of the object; drawing, as a first step of getting an estimated normal, a surface normal to the diffuse reflection area based on polarization information about the diffuse reflection area that has been obtained from the polarized image; drawing, as a second step of getting an estimated normal, a surface normal to the specular reflection area based on polarization information about the specular reflection area that has been obtained from the polarized image; and evaluating the degree of continuity between the estimated surface normals that have been drawn in the first and second steps, thereby dispelling the uncertainty of the surface normals. The surface shape of the object is reconstructed based on the polarized image thereof.

In another preferred embodiment, the image capturing section performs an image capturing step for obtaining the polarized images. Supposing an angle that defines a plane, which includes both a line connecting an imaging viewpoint and an observation point on the object together and a surface normal at the observation point, and that represents the angle of orientation of that plane around the line is identified by Ψ and the angle defined between the surface normal and the line on the plane is identified by θ, the image capturing step includes measuring the polarized light intensity of a light ray that is polarized parallel to the plane defined by the angle Ψ for each of a number of angles Ψ.

An image processing method according to the present invention is designed to estimate the surface shape of an object based on a polarized image thereof. The method includes the steps of: dividing the polarized image into a plurality of areas with different reflection properties including a specular reflection area and a diffuse reflection area; getting information about the refractive index of the object; drawing, as a first step of getting an estimated normal, a surface normal to the diffuse reflection area based on polarization information about the diffuse reflection area that has been obtained from the polarized image; drawing, as a second step of getting an estimated normal, a surface normal to the specular reflection area based on polarization information about the specular reflection area that has been obtained from the polarized image; and evaluating the degree of continuity between the estimated surface normals that have been drawn in the first and second steps, thereby dispelling the uncertainty of the surface normals. The method further includes the step of approximating the polarized light intensity of a pixel, associated with an observation point on the object, with a sinusoidal function based on the dependence of the polarized light intensity on an angle Ψ, thereby determining I(Ψ).

In this particular preferred embodiment, the method includes the step of calculating the average of polarized light intensities I(Ψ) associated with a certain pixel of the object and allocating that pixel to the specular reflection area, if the average light intensity is higher than a threshold value.

In another preferred embodiment, the image processing method further includes the step of splitting the polarized light intensity obtained from the specular reflection area into a specular reflection component and a diffuse reflection component.

In still another preferred embodiment, the first step of getting an estimated normal includes determining the angle of emittance of diffused light in the diffuse reflection area on an emittance plane by calculating a ratio that uses orthogonal and parallel components of a Fresnel reflection coefficient.

In this particular preferred embodiment, the second step of getting an estimated normal includes determining the angle of incidence of light that has come from a light source and that has been incident in the specular reflection area on an incident plane by calculating the ratio that uses the orthogonal and parallel components of the Fresnel reflection coefficient.

In a specific preferred embodiment, the image processing method further includes the step of updating the surface normals so as to narrow a difference between the surface normal in a first portion included in the diffuse reflection area and the surface normal in a second portion included in the specular reflection area if the first and second portions are located close to each other.

In yet another preferred embodiment, the image processing method includes the step of estimating the angle of a light source based on a geometric relation between the imaging viewpoint to capture the polarized image from and the surface normal to the specular reflection area.

In yet another preferred embodiment, the image processing method includes the step of separating the light intensity of the captured image that has been obtained from the specular reflection area into a specular reflection component and a diffuse reflection component according to a separation ratio that has been set.

In this particular preferred embodiment, separation ratio is determined so as to increase the spatial continuity of the light intensity on the image between the diffuse reflection components in the specular and diffuse reflection areas in the vicinity of a boundary between the specular and diffuse reflection areas.

In a specific preferred embodiment, the diffuse reflection component is determined so as to increase the spatial continuity of a color signal on a color image.

In yet another preferred embodiment, the step of dividing the polarized image into multiple areas with different reflection properties includes making the division based on a variation in the polarized light intensity of the object and an average light intensity value thereof.

An image processing apparatus according to the present invention is designed to get information about the surface shape of an object based on a polarized image thereof. The apparatus includes: a segmentation section for dividing the polarized image into a plurality of areas with different reflection properties including a specular reflection area and a diffuse reflection area; a refractive index information getting section for getting information about the refractive index of the object; a first normal estimating section for drawing an estimated surface normal to the diffuse reflection area based on polarization information about the diffuse reflection area that has been obtained from the polarized image; a second normal estimating section for drawing an estimated surface normal to the specular reflection area based on polarization information about the specular reflection area that has been obtained from the polarized image; and a normal updating section for correcting the surface normal to the specular reflection area based on the estimated surface normal that has been drawn to the diffuse reflection area.

In one preferred embodiment, the image processing apparatus further includes an image capturing section for producing the polarized image. The image capturing section includes a patterned polarizer where a number of polarizer elements, of which the axes of polarization are defined in at least three different directions, are arranged regularly.

In this particular preferred embodiment, patterned polarizer includes nine polarizer elements, of which the axes of polarization are defined in mutually different directions.

In a specific preferred embodiment, the image capturing section includes a plurality of subpixels, which are respectively associated with the multiple polarizer elements of the patterned polarizer, and a pixel unit is formed by a set of subpixels that have been selected from the subpixels.

Another image processing apparatus according to the present invention includes: an image capturing section for getting both color information and polarization information about light reflected from an object; and a segmentation section for dividing the image into a plurality of areas with different reflection properties, including a specular reflection area and a diffuse reflection area, based on the color information. The apparatus determines surface normal information about the object so as to increase the degree of agreement between pieces of shape information obtained from the color information among the multiple areas with the different reflection properties.

Another image processing system according to the present invention includes: the image processing apparatus of the present invention described above; means for providing information about the refractive index of an object for the refractive index information getting section of the image processing apparatus; and a storage medium for getting the surface normal information about the object, which has been determined by the image processing apparatus, from the apparatus and storing the information.

In one preferred embodiment, the image processing apparatus is built in a camera.

An image format according to the present invention is designed to store images that have been obtained from an image capture camera. The format includes: a specular reflected image of an object; a diffuse reflected image; surface normal information at respective pixel locations of the object; and light source information obtained at the object's position.

Effects of the Invention

According to the present invention, information about the shape of a given object in a normal environment or scene can be obtained based on the polarization information about the object. In addition, information about the illumination source can also be obtained by separating the specular reflection component and the diffuse reflection component of the object from each other.

Figure 13:
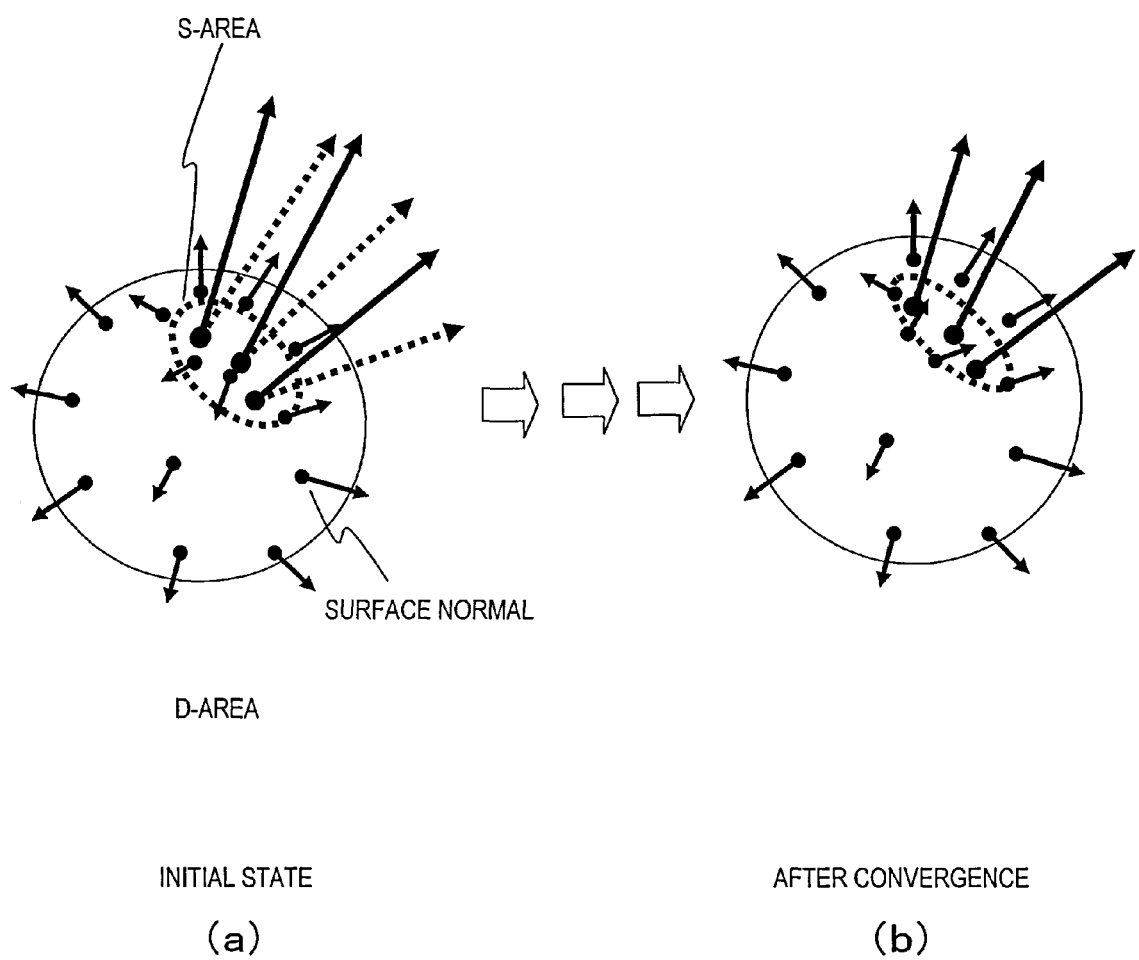

Portions (a) and (b) of FIG. 13 are schematic representations illustrating what effect will be achieved by the iterative processing by the normal updating section.

Figure 14:
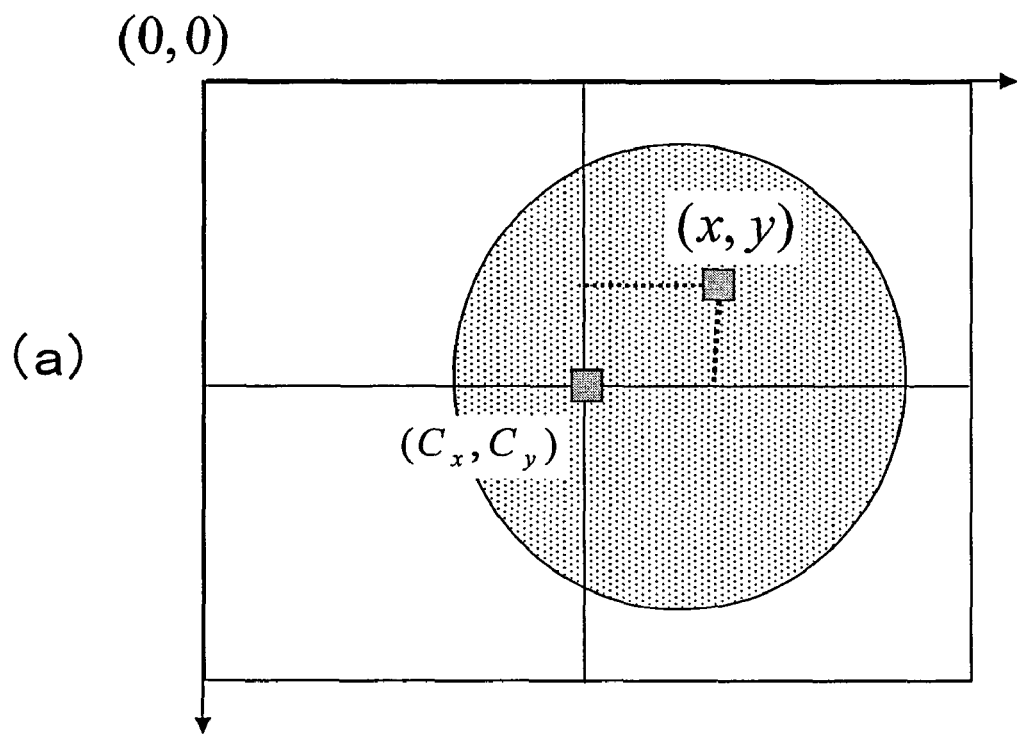
Figure 14:
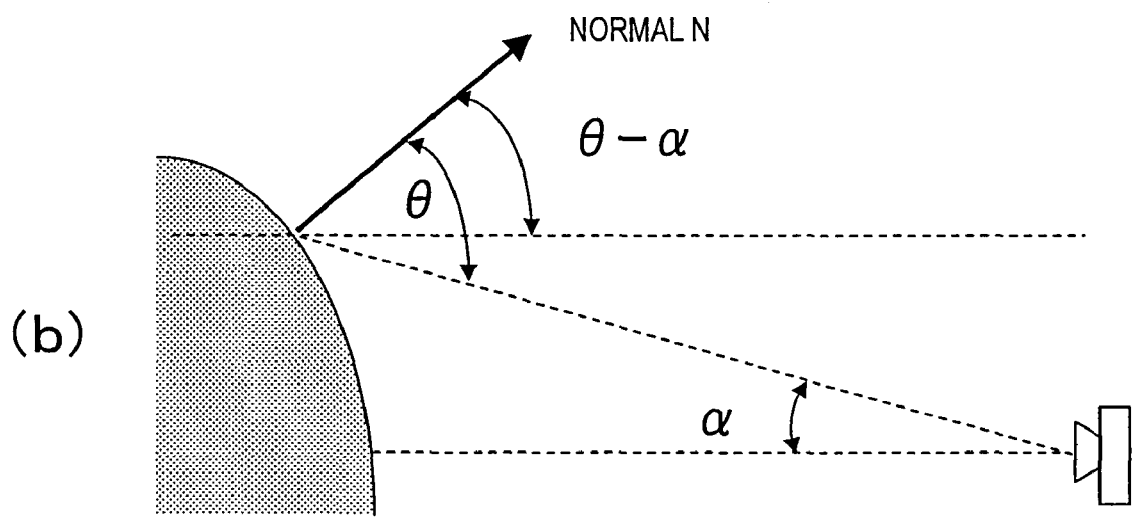

FIGS. 14(a) and 14(b) are schematic representations showing the relations between the angle of incidence, the angle of emittance and the surface normal.

Figure 15:
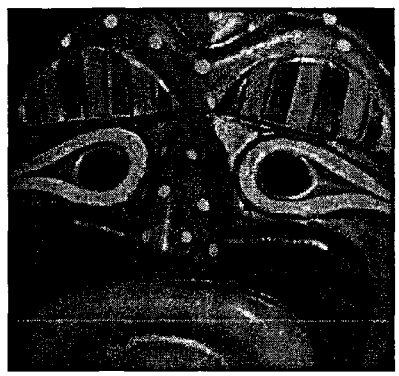
Figure 15:
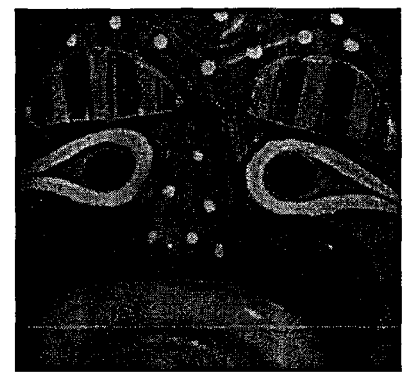
Figure 15:
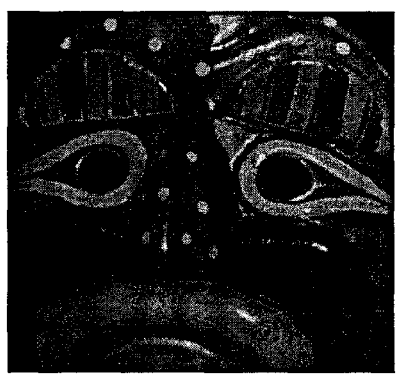
Figure 15:
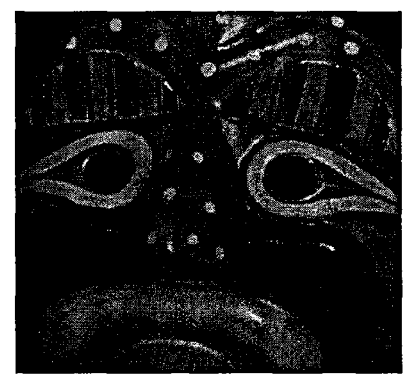

FIG. 15 shows four polarized images, of which the axes of polarization have angles of orientation Ψ of 0, 45, 90 and 135 degrees, respectively.

Figure 16:
Figure 16:
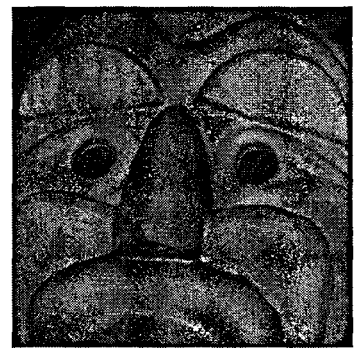

FIG. 16 shows images representing surface normal shapes.

Figure 17:
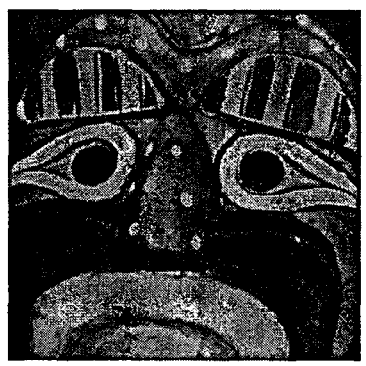
Figure 17:
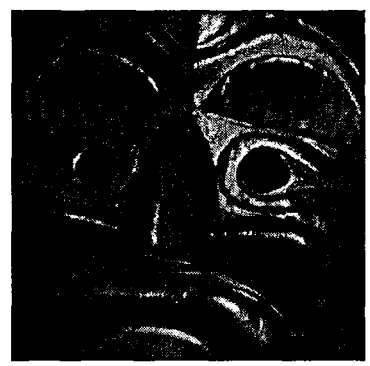

FIG. 17 shows a diffuse reflected image and a specular reflected image.

Figure 18:
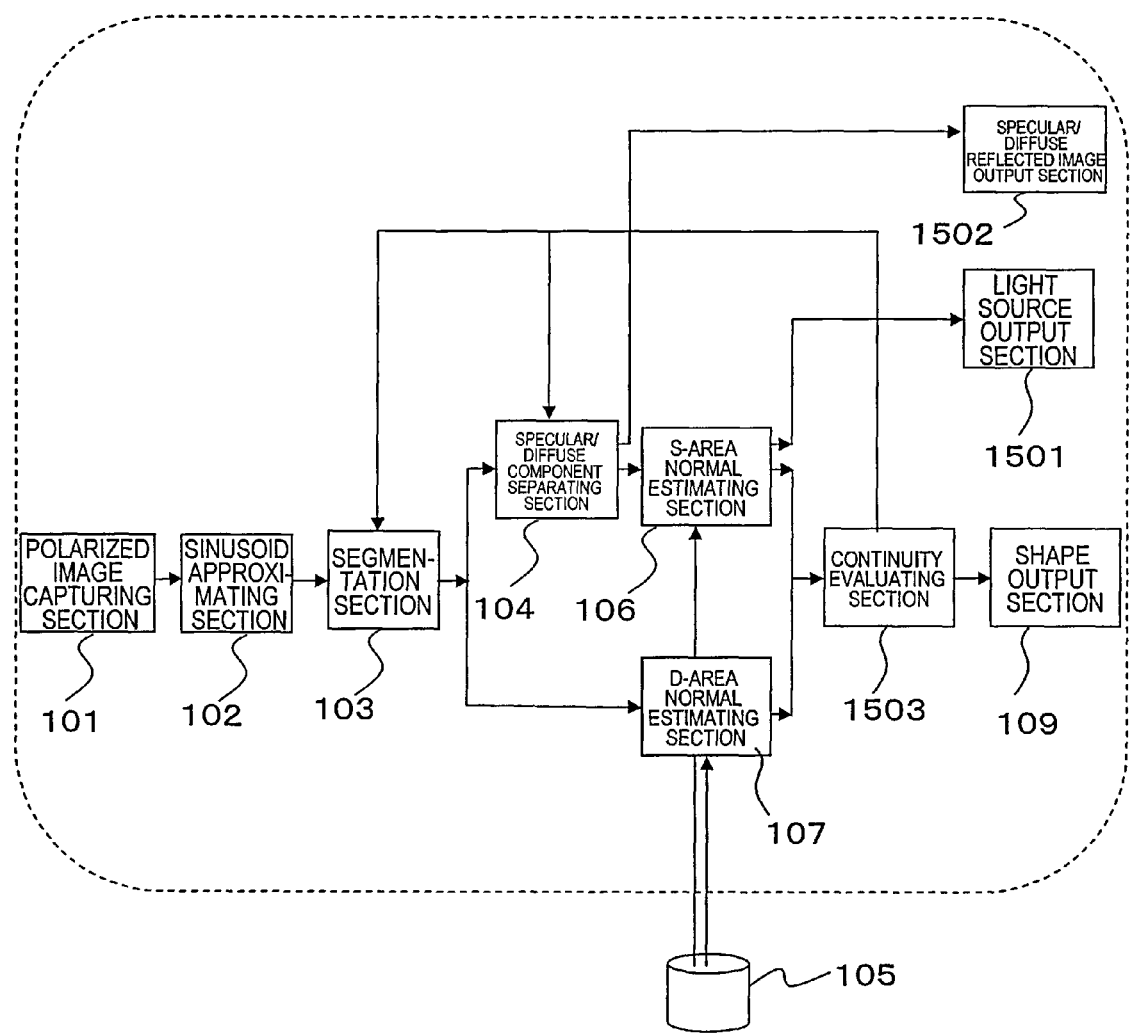

FIG. 18 is a block diagram showing a configuration for an image input apparatus as a second preferred embodiment of the present invention.

Figure 19:
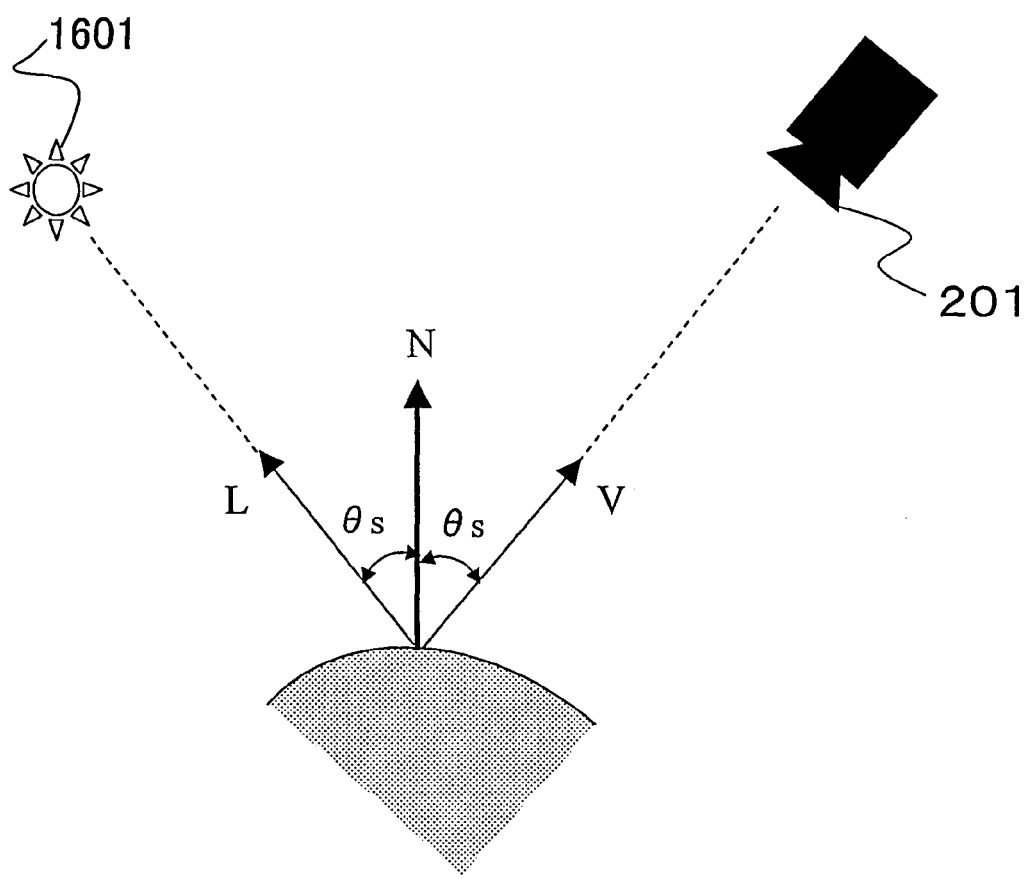

FIG. 19 is a schematic representation showing how the light source output section estimates the angle of the light source.

Figure 20:
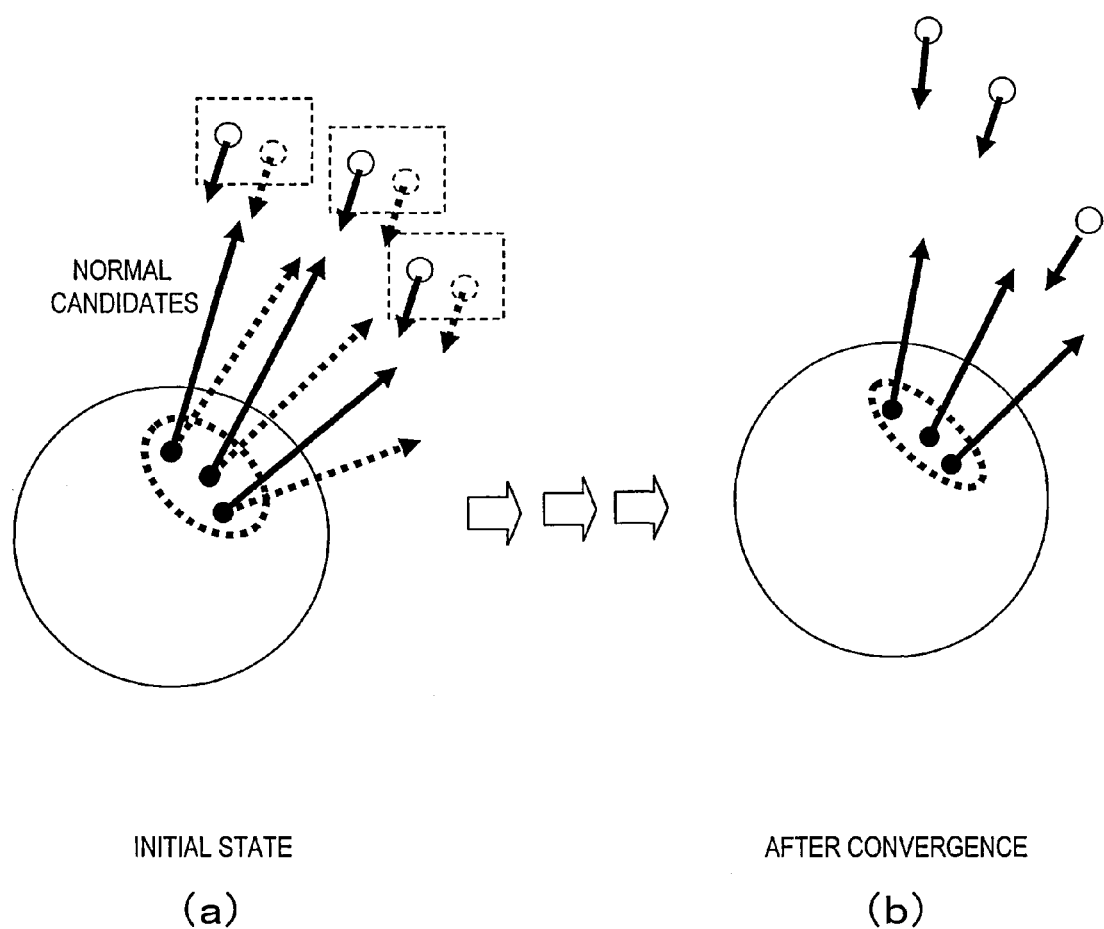

Portions (a) and (b) of FIG. 20 are schematic representations showing how the detection of the light source by the continuity evaluating section converges.

Figure 21:
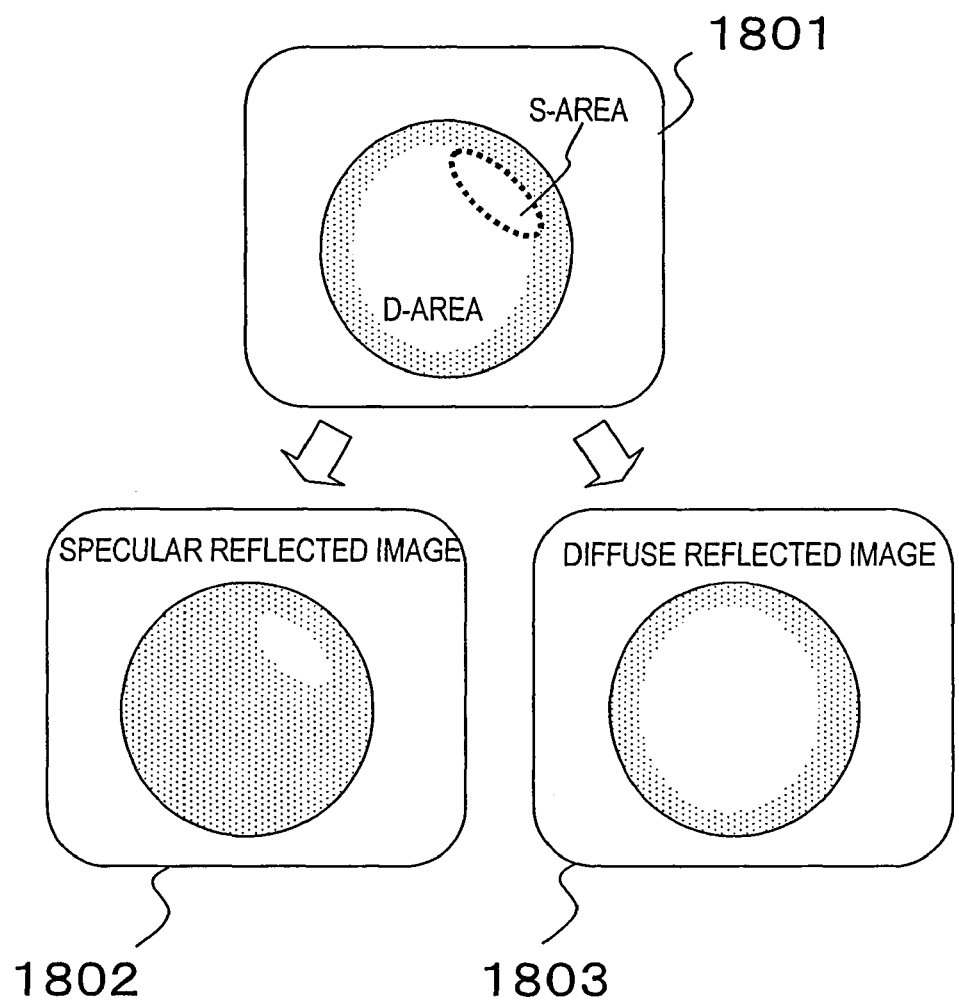

FIG. 21 is a schematic representation illustrating how to separate an image into a specular reflected image and a diffuse reflected image.

FIGS. 22(a) through 22(c) schematically show how to make the best separation with the continuity of diffuse reflection components maintained.

Figure 23:
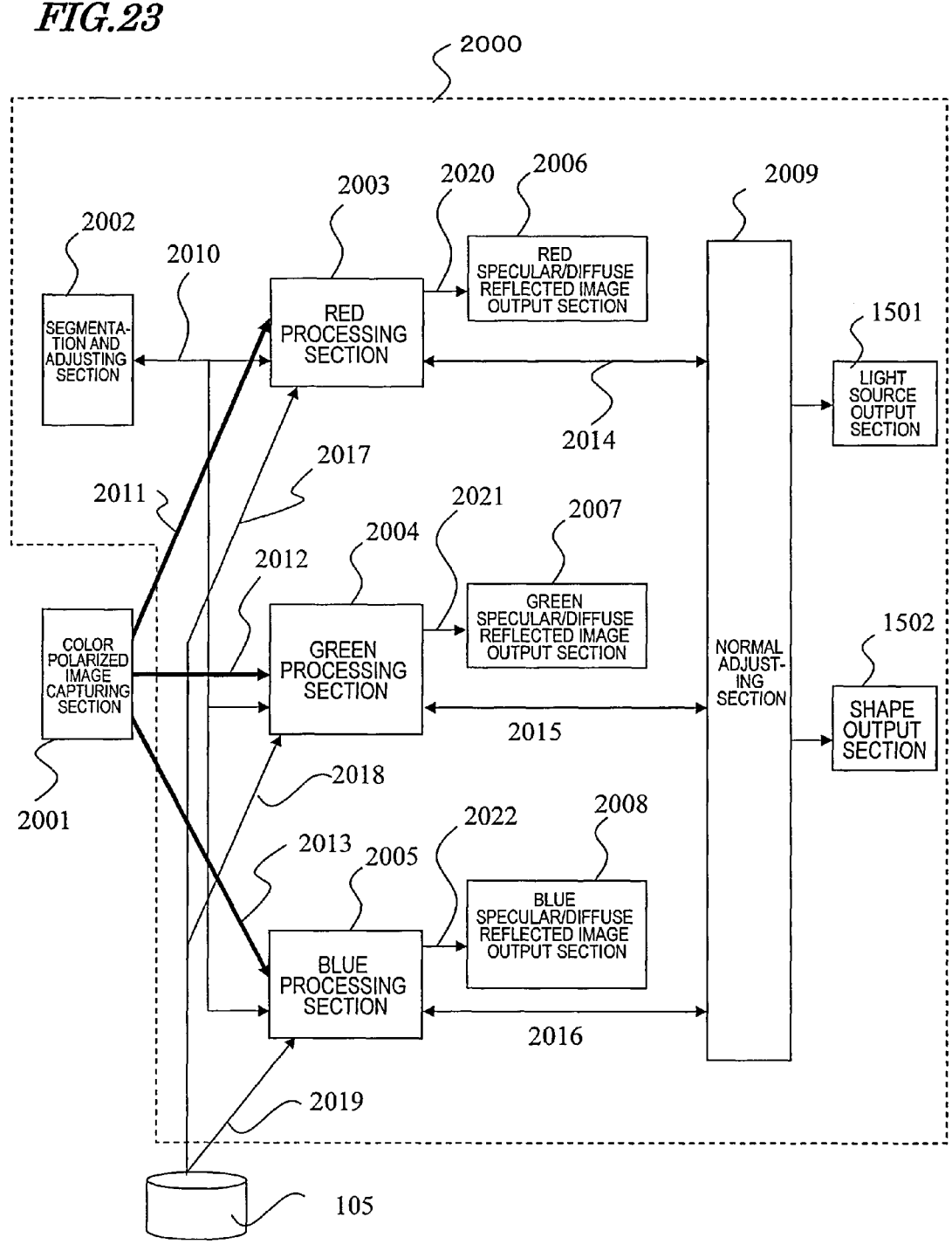

FIG. 23 is a block diagram showing a configuration for an image input apparatus for a color image as a third preferred embodiment of the present invention.

Figure 24:
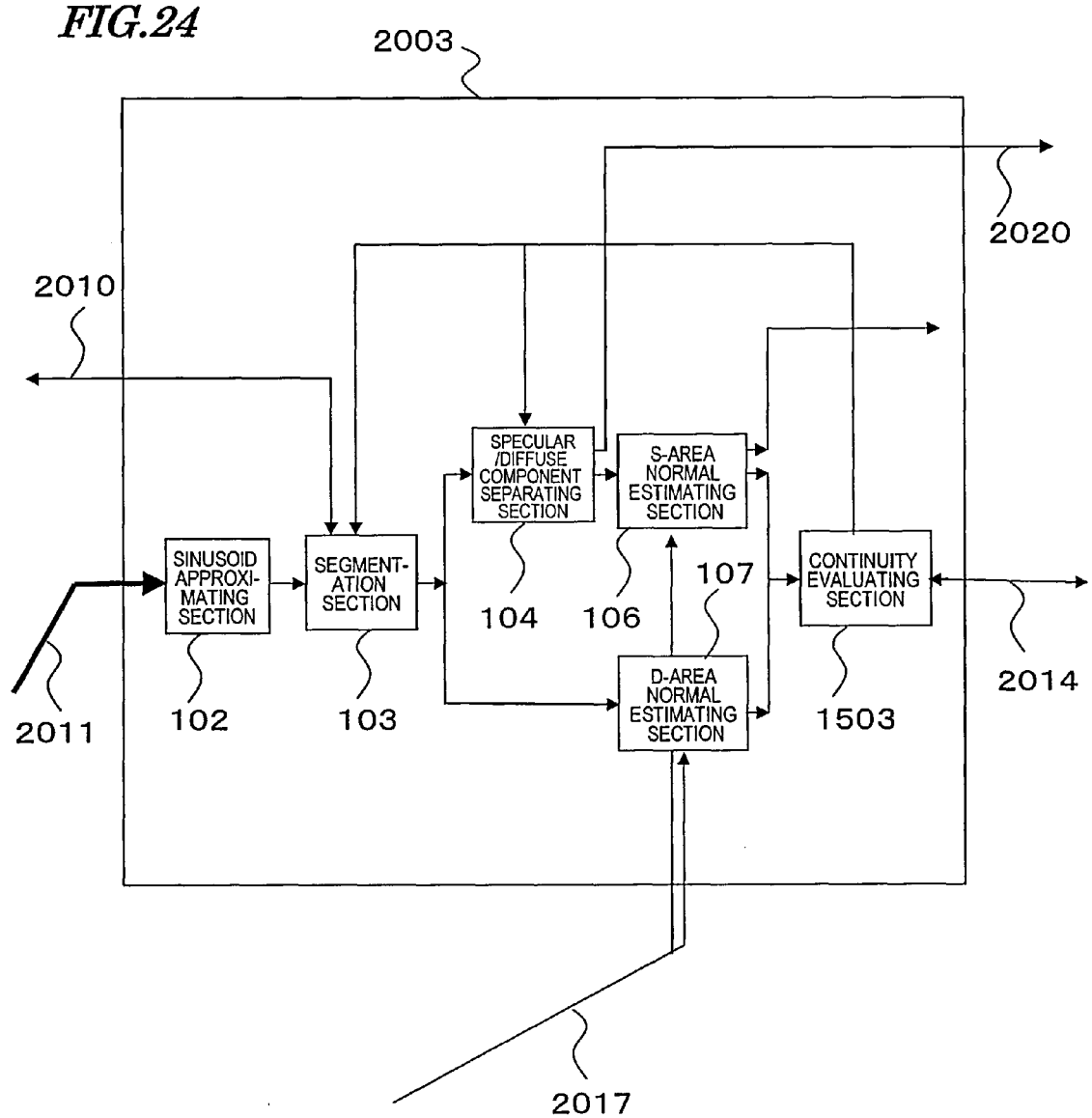

FIG. 24 is a block diagram showing a configuration for a Red processing section according to the third preferred embodiment of the present invention.

Figure 25:
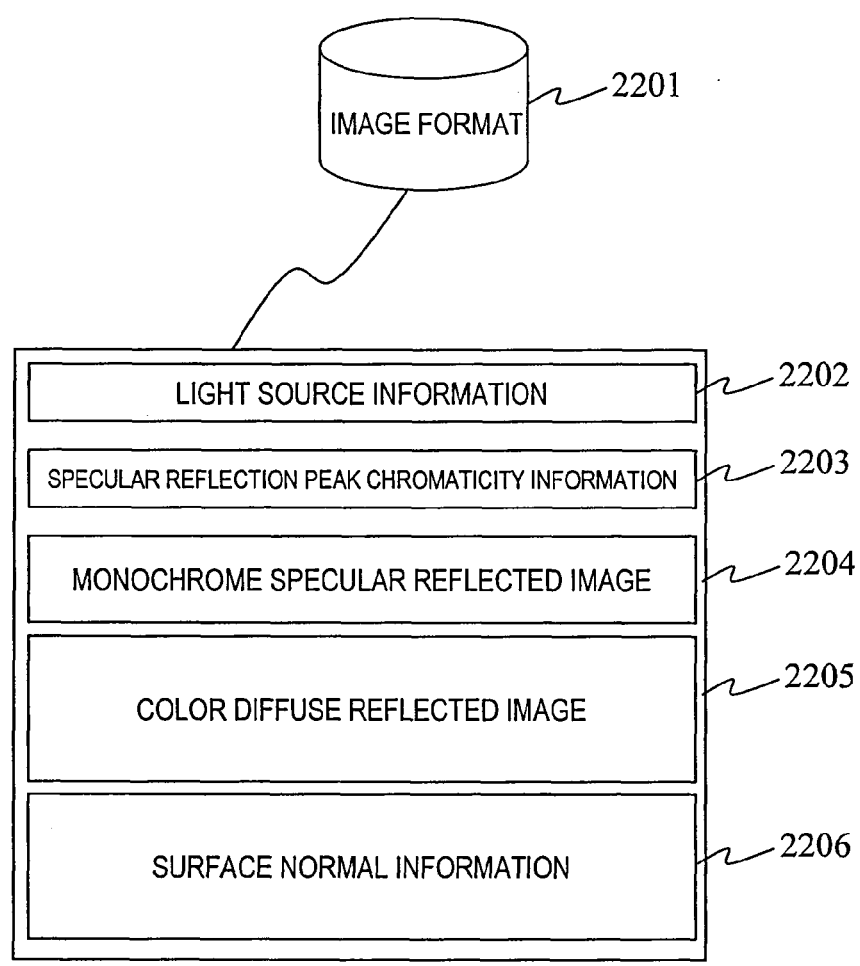

FIG. 25 is a schematic representation illustrating a color image format according to the third preferred embodiment of the present invention.

Figure 26:
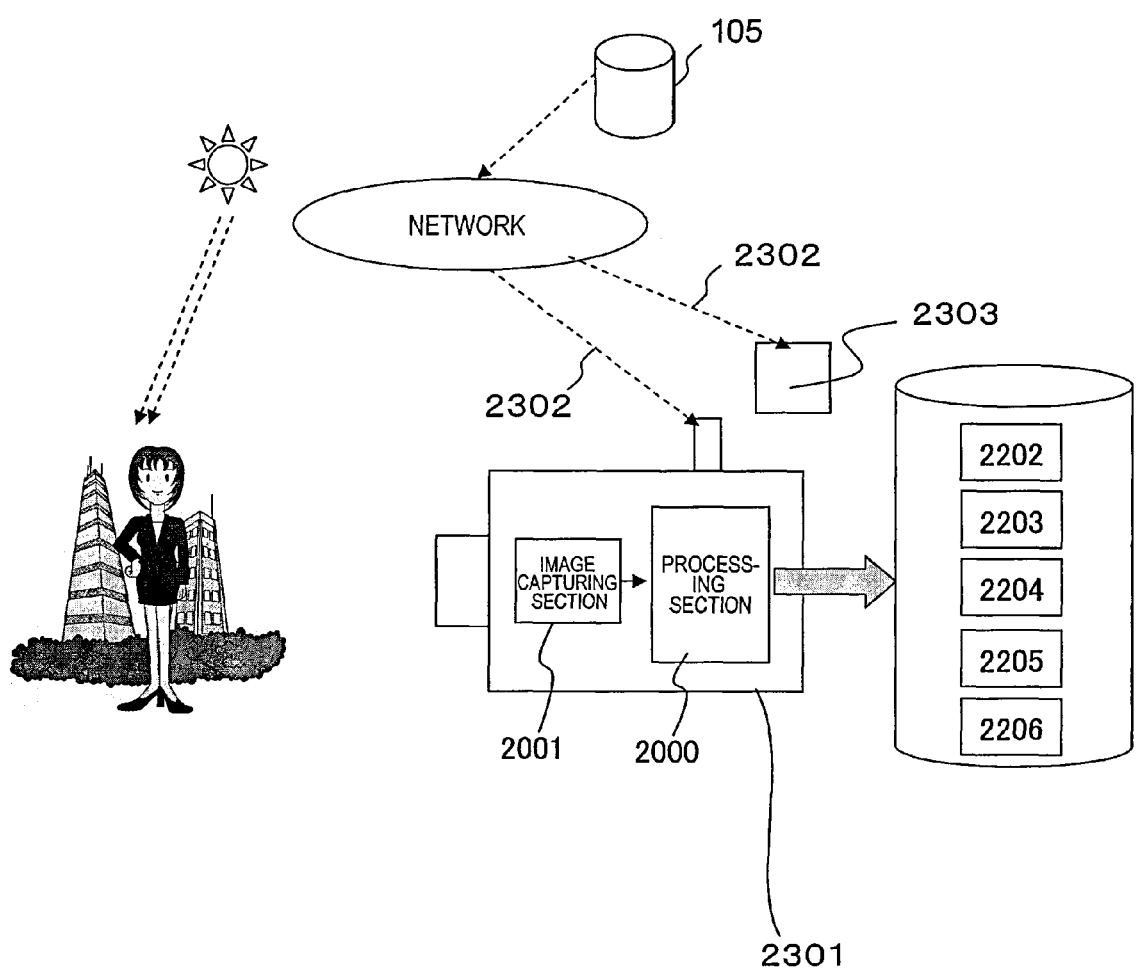

FIG. 26 is a schematic representation illustrating color polarization vision camera as a fourth preferred embodiment of the present invention.

Figure 27:
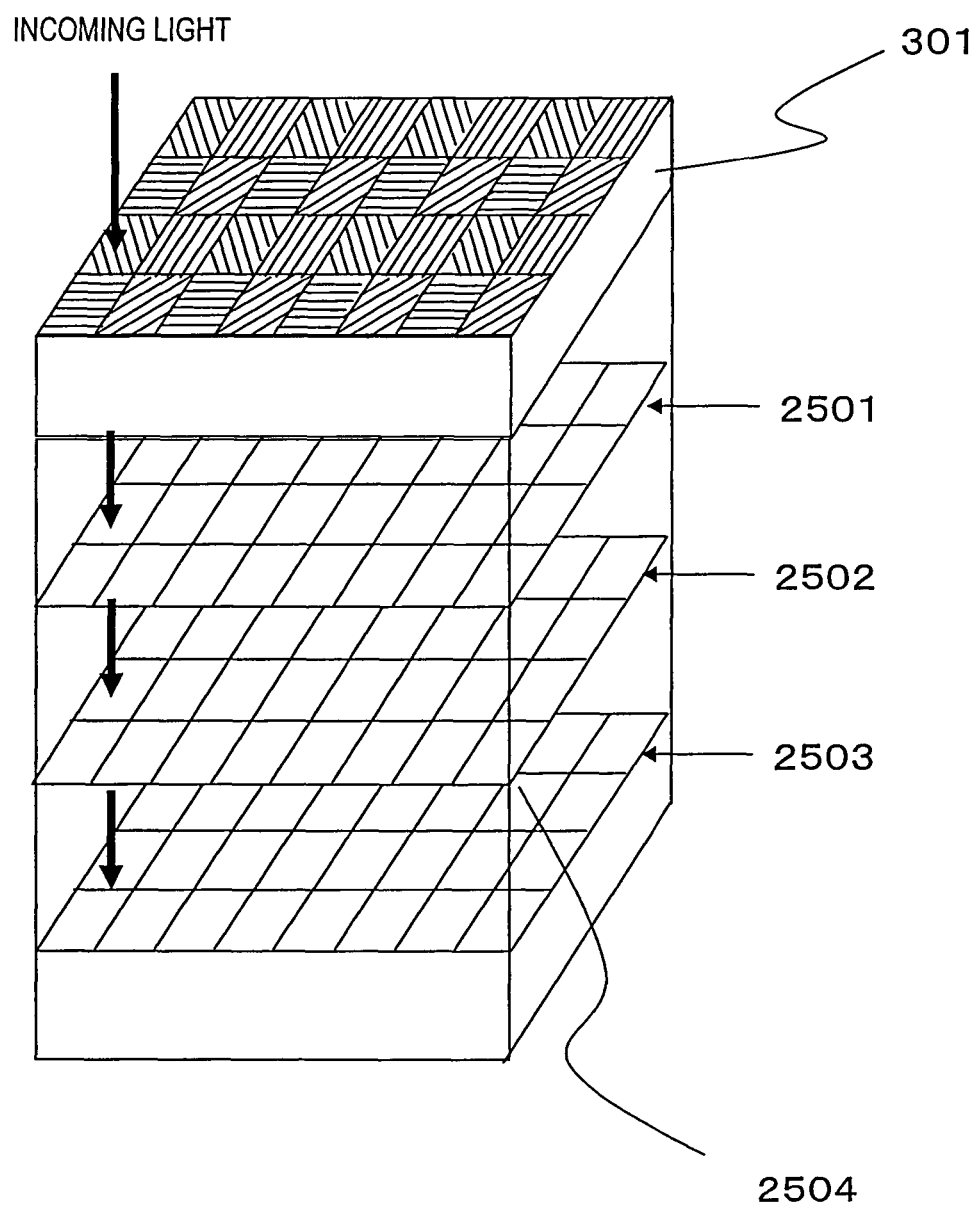

FIG. 27 illustrates a color polarized image capturing section according to the fourth preferred embodiment of the present invention.

Figure 28:
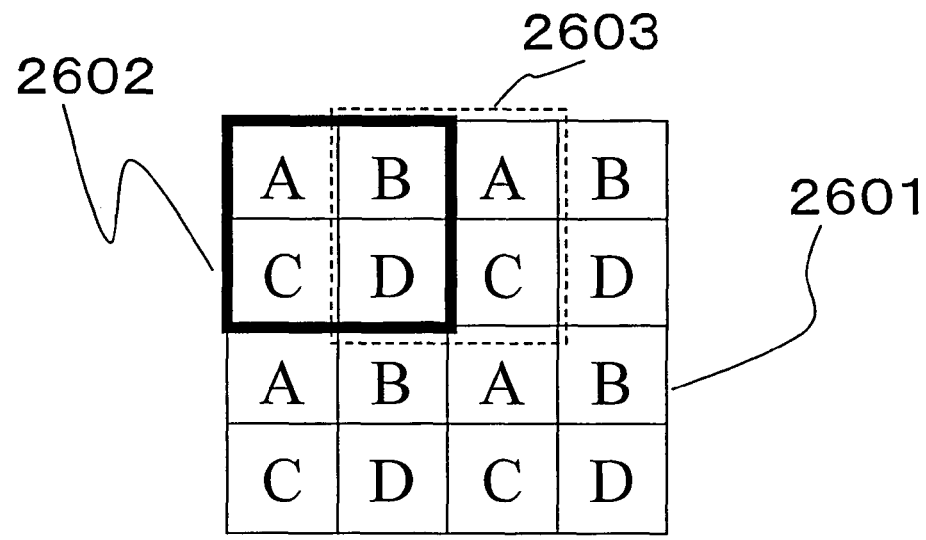
Figure 28:
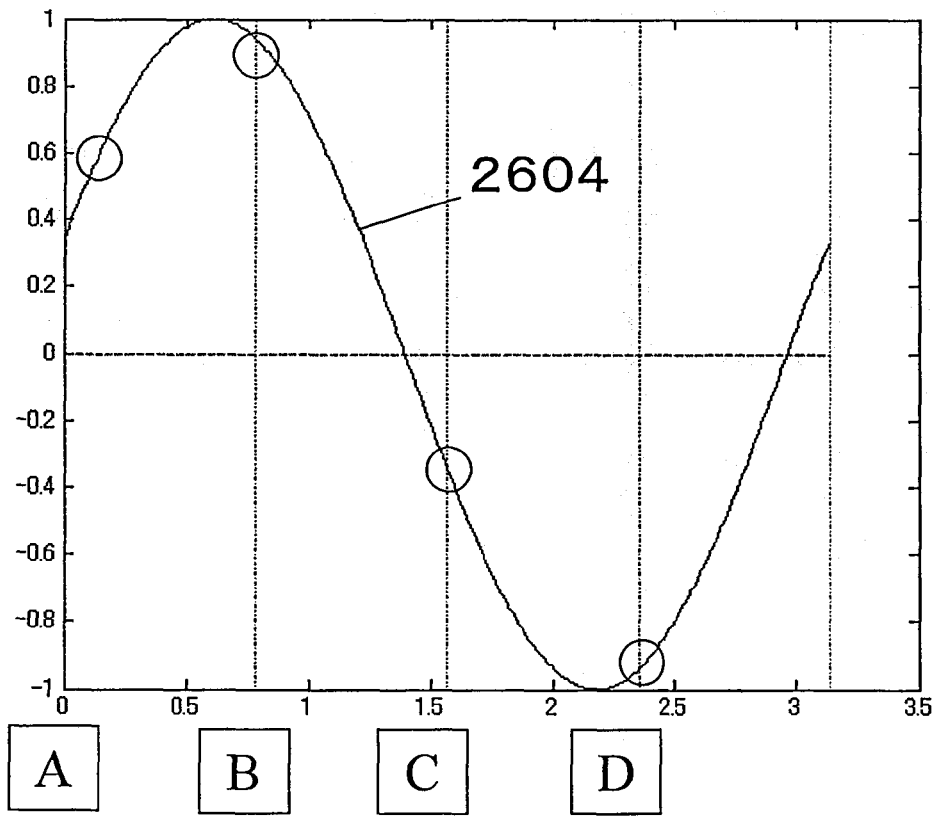

FIG. 28 illustrates a configuration for the patterned polarizer of the color polarized image capturing section according to the fourth preferred embodiment of the present invention.

Figure 29:
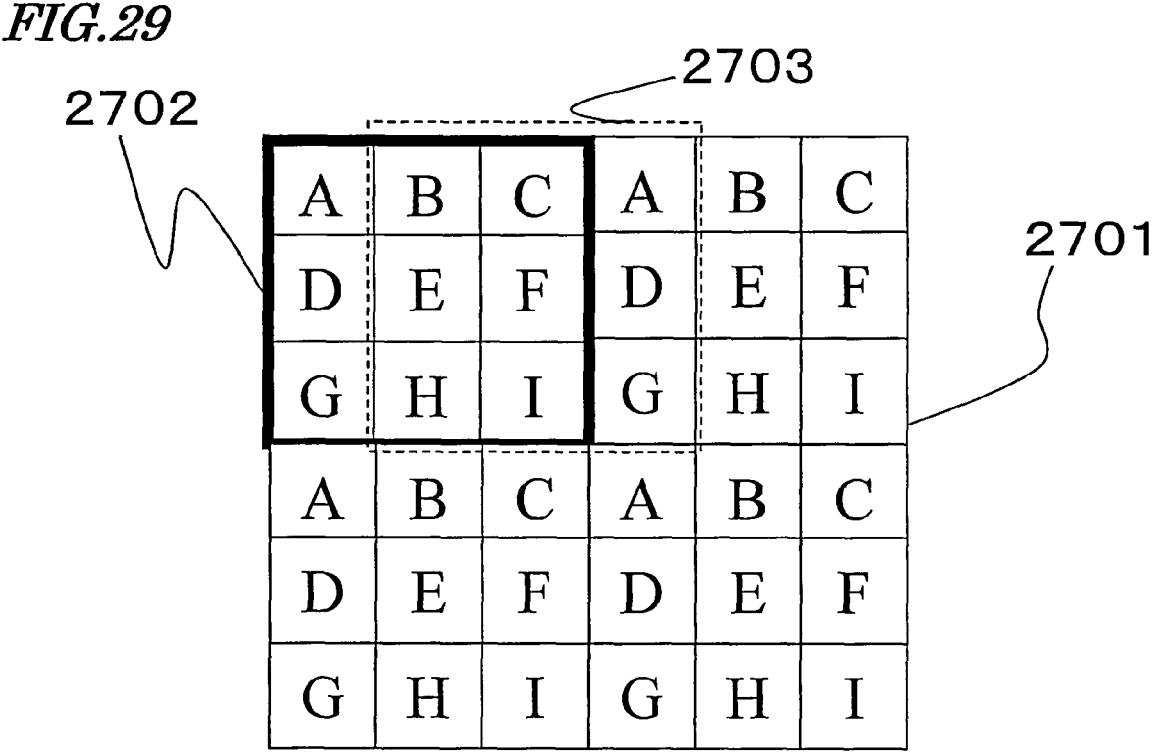
Figure 29:
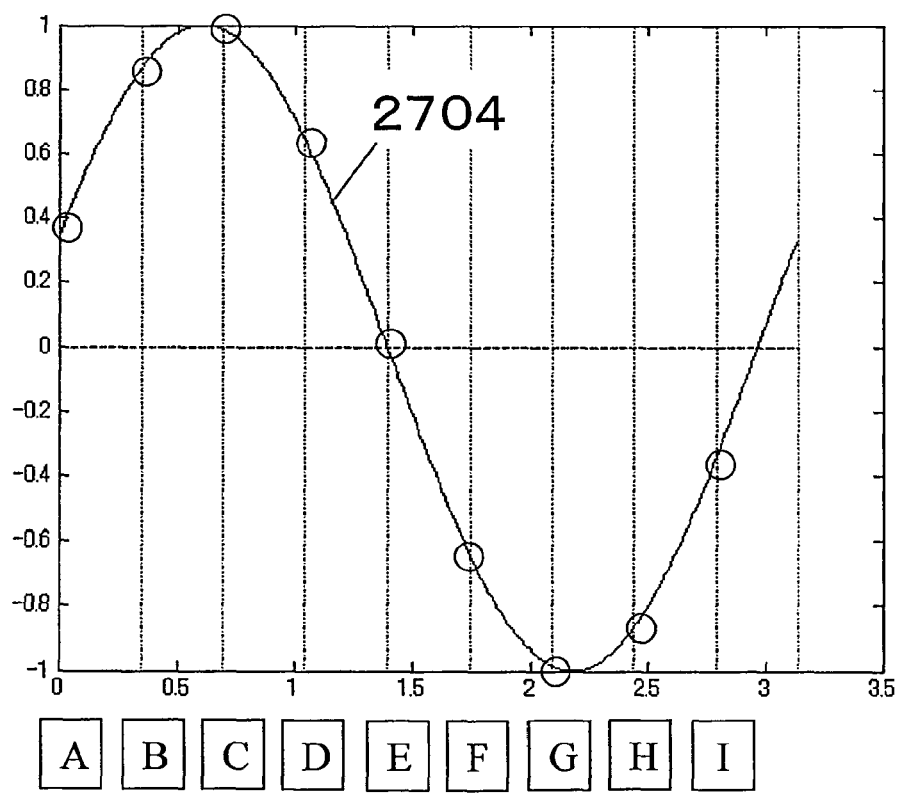

FIG. 29 illustrates another configuration for the patterned polarizer of the color polarized image capturing section according to the fourth preferred embodiment of the present invention.

Figure 30:
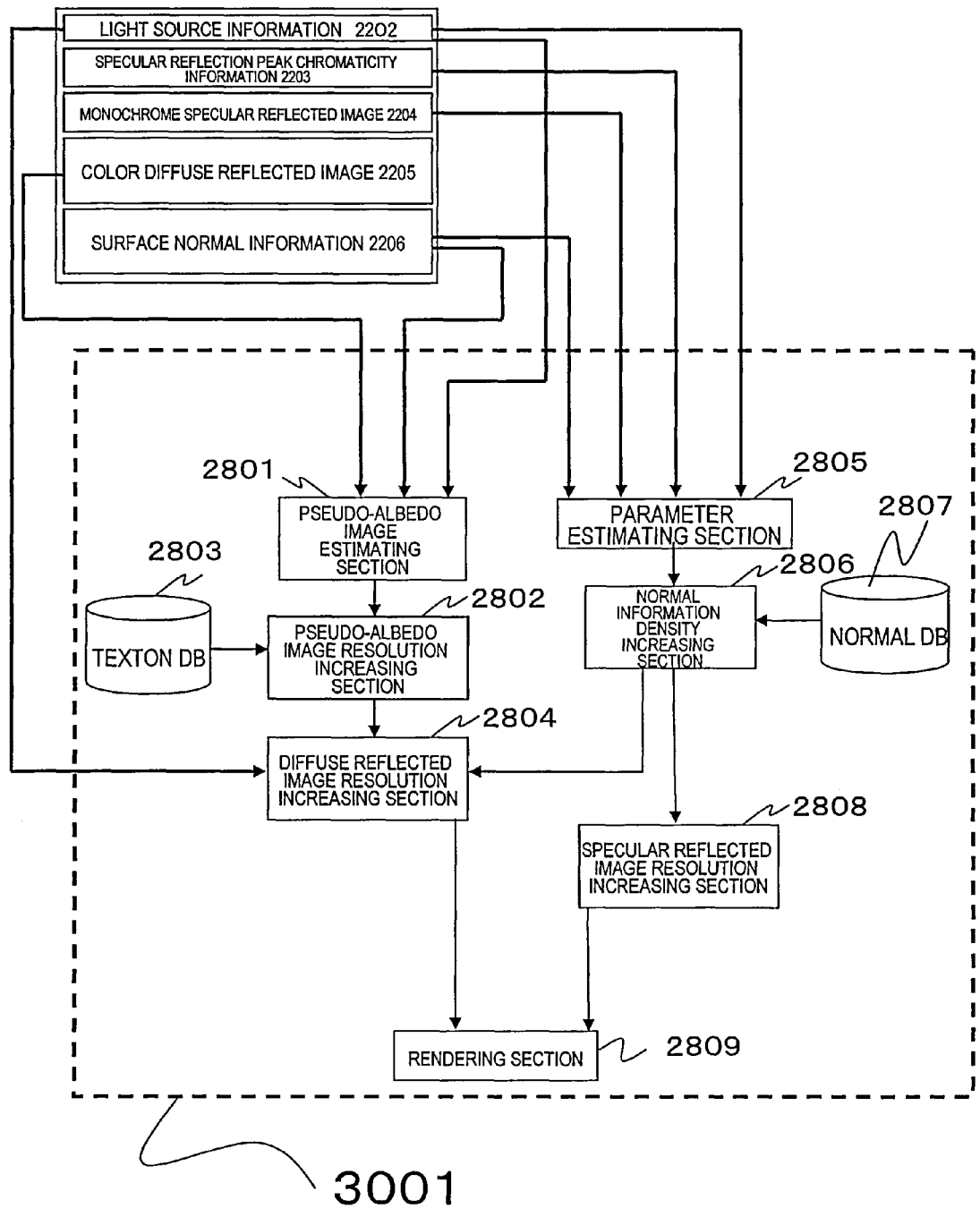

FIG. 30 is a block diagram illustrating a configuration for a color image high resolution reproduction display section 3001 as a fifth preferred embodiment of the present invention.

Figure 31:
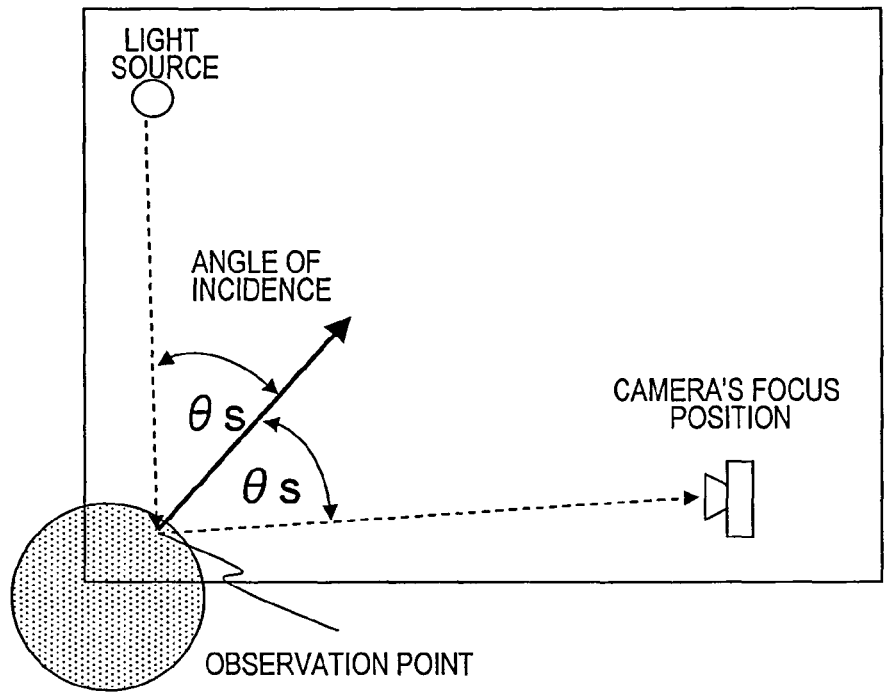
Figure 31:
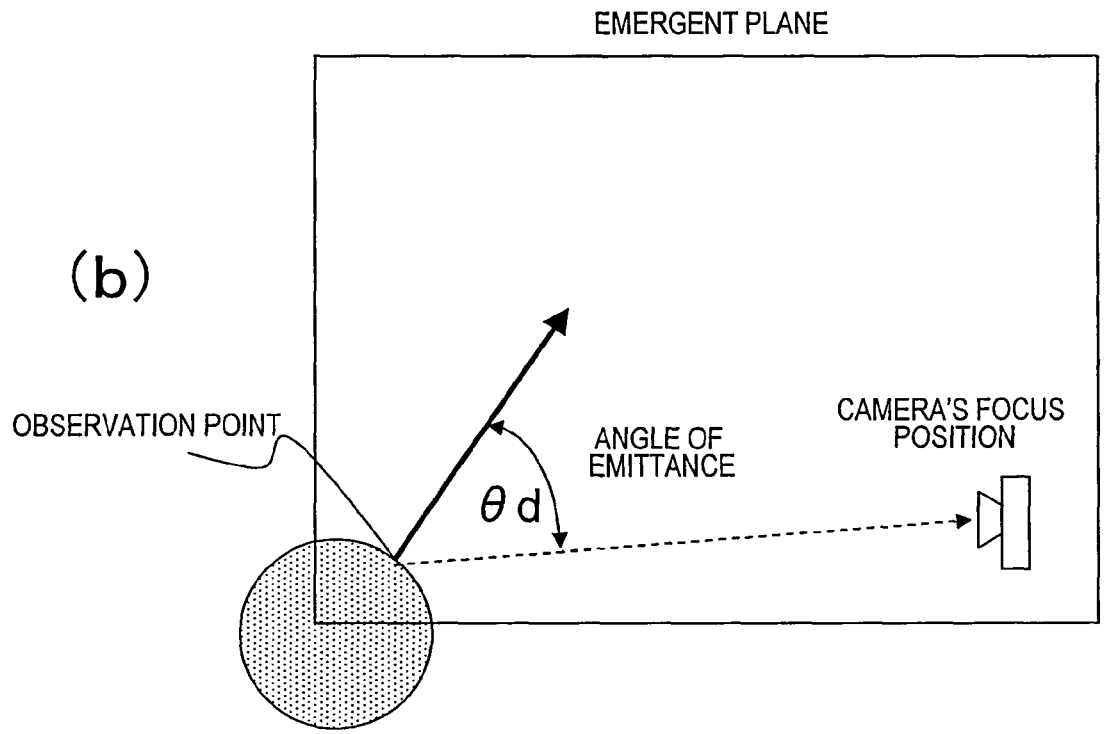

FIGS. 31(a) and 31(b) illustrate an incident plane and an emittance plane, respectively.

Figure 32:
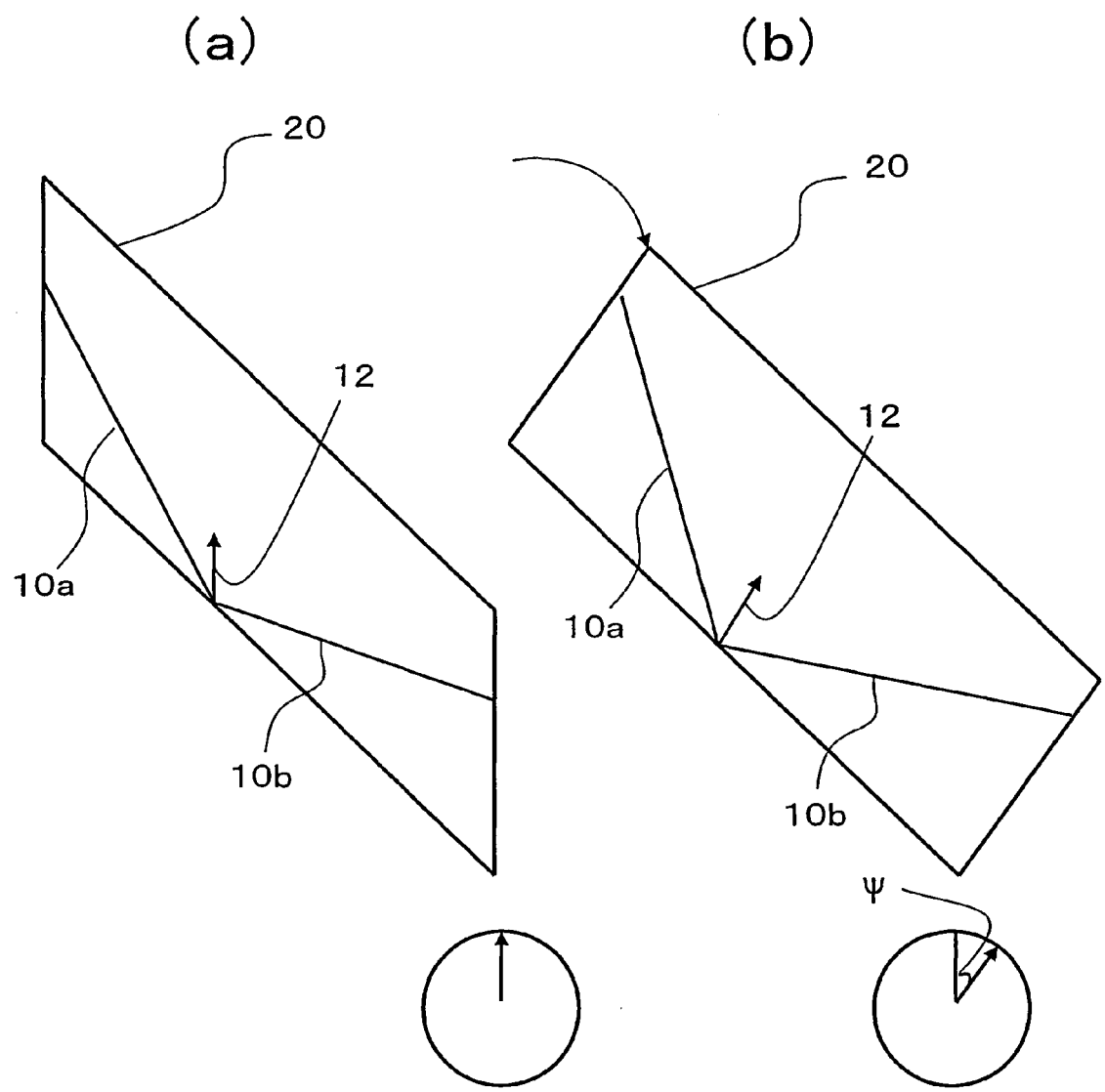

FIGS. 32(a) and 32(b) illustrate an angle Ψ formed between two incident planes.

Figure 33:
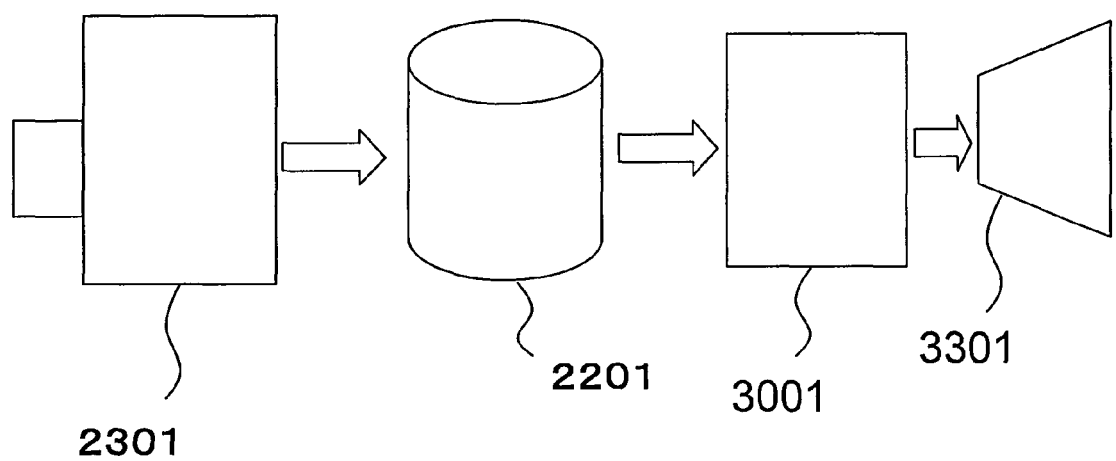

FIG. 33 illustrates the concept of an image processing system according to the present invention.

DESCRIPTION OF REFERENCE NUMERALS 101 polarized image capturing section
102 sinusoid approximating section
103 segmentation section
104 specular/diffuse component separating section
105 object's refractive index information database
106 S-area normal estimating section
107 D-area normal estimating section
108 normal updating section
109 shape output section
110 normal estimating section

BEST MODE FOR CARRYING OUT THE INVENTION

According to the present invention, a given object is spatially separated into a specular reflection area (also called a "specular area") and a diffuse reflection area (also called a "diffuse area"), which will be simply referred to herein as an "S-area" and a "D-area", respectively. Also, according to the present invention, pieces of information about surface normals to the S- and D-areas are gotten by mutually different methods. In a preferred embodiment of the present invention, the surface normal to the S-area is determined so as to increase the degree of agreement between, the surface normals in the vicinity of the boundary between those two areas. In other words, the surface normal to the S-area is determined based on the surface normal to the D-area. That is why compared to the conventional technique of determining the surface normal by only the specular reflection (or regular reflection) from the S-area, the surface normal can be defined over a broad range of the object. On top of that, by using the polarization information in the S-area, information about the illumination source can also be obtained based on geometric constraints of regular reflection.

Hereinafter, preferred embodiments of the present invention will be described with reference to the accompanying drawings.

Embodiment 1

First of all, a first preferred embodiment of an image input apparatus according to the present invention will be described.

Figure 1:
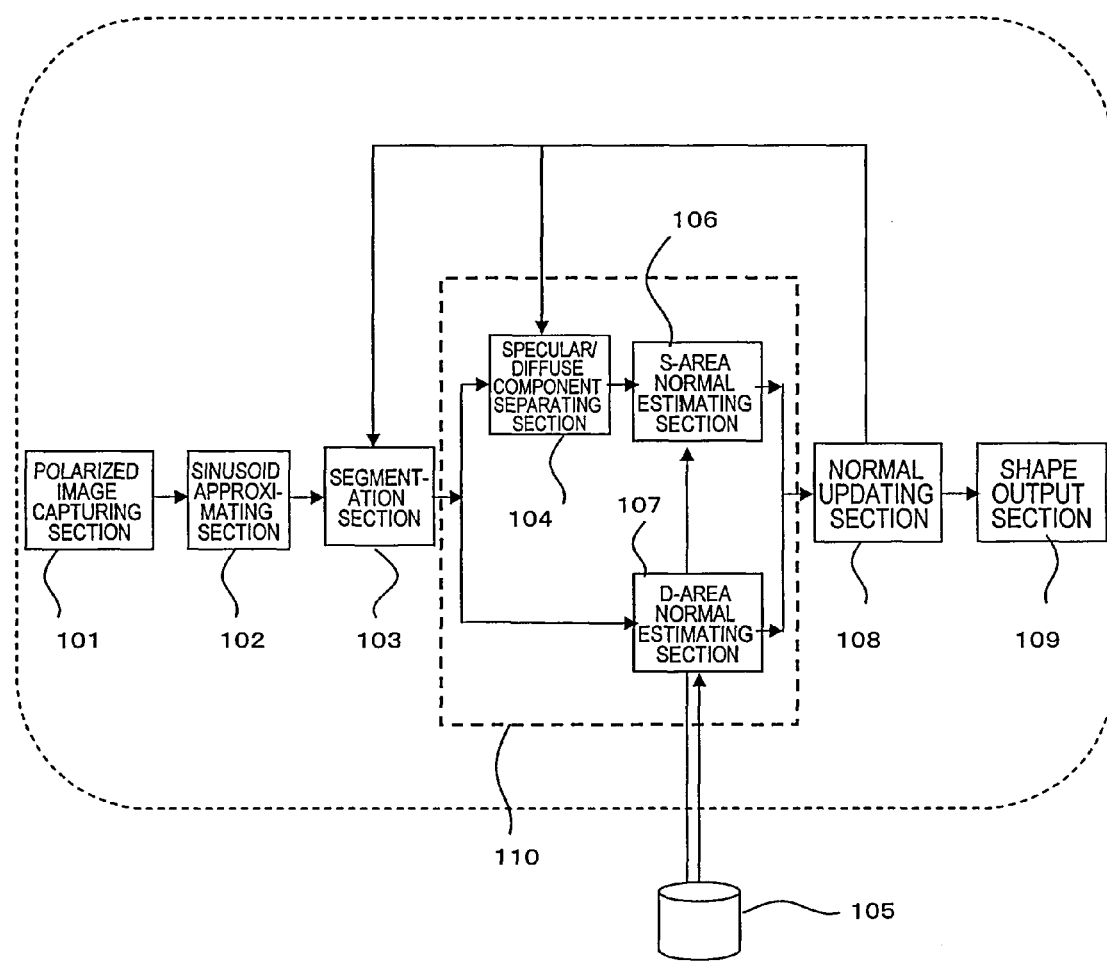
FIG. 1 is a block diagram showing a configuration for an image input apparatus as a first preferred embodiment of the present invention.

FIG. 1 is a block diagram showing a configuration for an image input apparatus as a first preferred embodiment of the present invention. This image input apparatus includes a polarized image capturing section 101, a sinusoid approximating section 102, a segmentation section 103, a normal estimating section 110, a normal updating section 108, and a shape output section 109. The normal estimating section 110 includes a specular/diffuse component separating section 104, an S-area normal estimating section 106 and a D-area normal estimating section 107. This image input apparatus gets refractive index information from the object's refractive index information database 105, which does not have to form an integral part of this image input apparatus.

Figure 2:
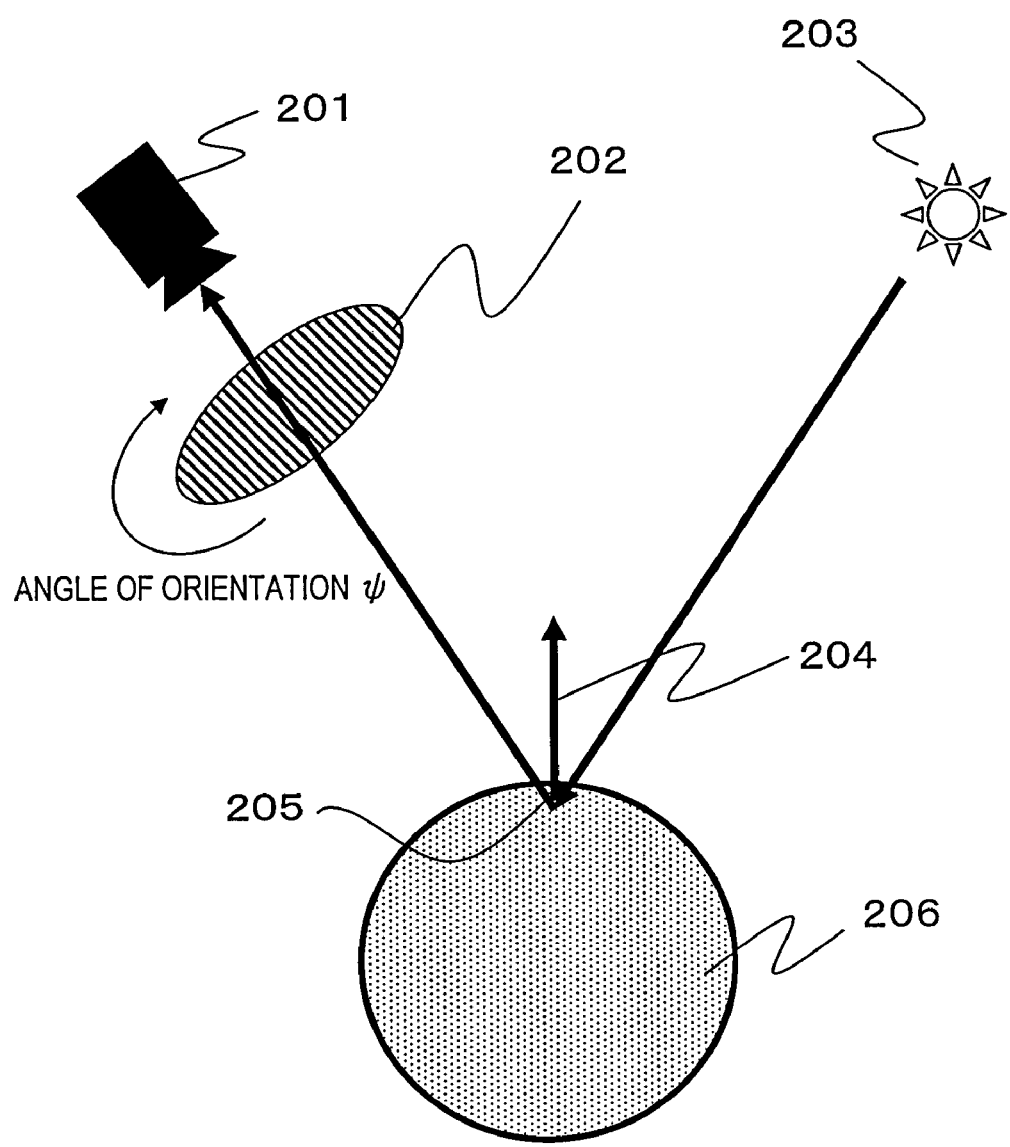
FIG. 2 is a schematic representation illustrating a preferred embodiment of the polarized image capturing section.

The polarized image capturing section 101 is a device for taking a number of polarized images of the object, and may include a camera 201 and a polarizer 202, which is arranged rotatably in front of the lens of the camera 201, as shown in FIG. 2. The camera 201 may be any known image capture device and can capture an image of the object 206 that is illuminated with a non-polarized or randomly-polarized light ray emitted from a light source 203. By rotating the polarizer 202 from 0 degrees through 180 degrees with an appropriate step (of 5 degrees, for example) while maintaining the geometric arrangement between the object 206, the camera 201 and the light source 203, a number N of images are shot. As a result, images with N different light intensities are captured at the observation point 205 on the object 206.

The polarized image capturing section 101 does not have to have the arrangement shown in FIG. 2. Alternatively, the polarized image capturing section 101 may include the patterned polarizer camera 304 shown in FIG. 3. When a real time moving picture needs to be shot, for example, the patterned polarizer camera 304 is preferably used.

Figure 3:
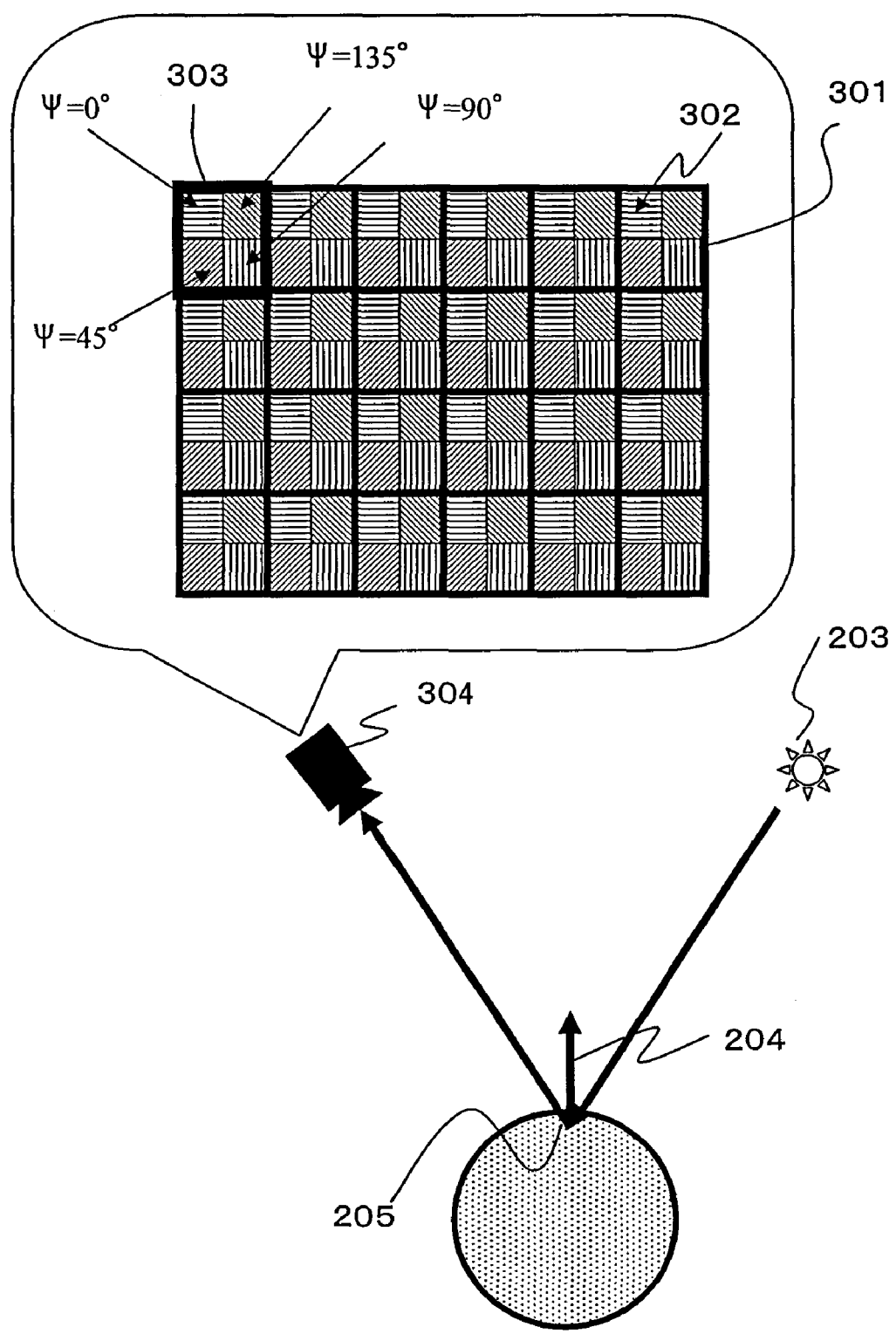
FIG. 3 is a schematic representation illustrating another preferred embodiment of the polarized image capturing section.

Specifically, the patterned polarizer camera 304 is a camera in which a special type of image capture sensor, including the patterned polarizer 301, is built, and can obtain an image with a normal light intensity and a polarized image simultaneously in real time. A number of pixels 302 are arranged there in columns and rows to define a matrix pattern. In FIG. 3, the lines drawn in each of those pixels 302 indicate the direction of the major axis of polarization of a micro-polarizer that is arranged on that pixel 302. That is to say, this image capture device includes subpixels 302, of which the axes of polarization define four angles of orientation Ψ of 0, 45, 90 and 135 degrees (i.e., which have four different polarization directions). Each set of four subpixels 302, of which the axes of polarization define the four different angles of orientation Ψ, is arranged so as to form one of the pixel units 303 of the Bayer array shown in FIG. 3. Each of those pixel units 303 is handled as a single pixel. Such an image capture device can capture four types of images with four different polarization directions simultaneously in parallel with each other. That is why four types of polarized images can be obtained even without rotating the polarizer. As a result, the variation in light intensity can be approximated with a sinusoidal function. It should be noted that in getting the polarization information, the dynamic range and the number of bits of light intensity are preferably as large as possible (e.g., 16 bits) and the shooting gamma is preferably equal to one.

Look at FIG. 1 again.

The sinusoid approximating section 102 approximates the light intensities of the N images with different polarized light intensities thus obtained on a pixel-by-pixel basis with a sinusoidal function. In this preferred embodiment, the reflected light intensity I with respect to the angle of orientation Ψ of the axis of polarization is approximated by the following Equation (1):

$$I(\psi) = A \cdot \sin 2(\psi - B) + C \qquad \text{Equation (1)}$$

Figure 4:
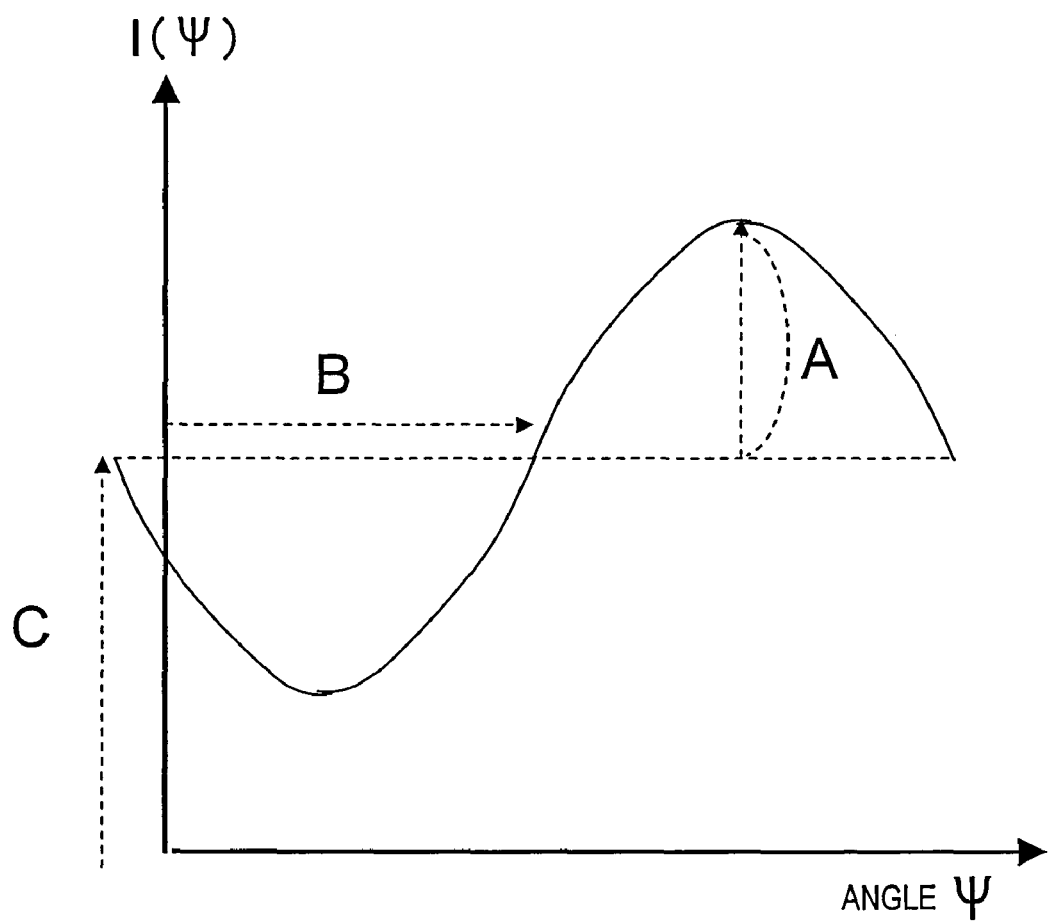
FIG. 4 schematically shows how to approximate a polarized light intensity variation curve with a sinusoidal function.

FIG. 4 is a graph schematically showing an approximated one of the polarized light intensity variation curve represented by Equation (1). A, B and C included in Equation (1) and shown in FIG. 4 are constants respectively representing the amplitude, phase and average of the polarized light intensity variation curve.

Equation (1) can be expanded into the following Equation (2):

$$I(\psi) = a \cdot \sin 2\psi + b \cdot \cos 2\psi + C \qquad \text{Equation (2)}$$

It should be noted that a, b and A, B and C should satisfy the relations represented by the following Equations (3):

$$A = \sqrt{a^2 + b^2},$$
$$\sin(-2B) = \frac{b}{\sqrt{a^2 + b^2}},$$
$$\cos(-2B) = \frac{a}{\sqrt{a^2 + b^2}}$$
$$\text{Equations (3)}$$

If a, b and c that will minimize the evaluation equation represented by the following Equation (4) are obtained for each pixel of the N images with different polarized light intensities, then A, B and C are determined by Equation (3), thus achieving an approximation using the sinusoidal function represented by Equation (1).

$$f(a, b, C) = \sum_{i=0}^{N-1}(I_i - a \cdot \sin 2\psi_i - b \cdot \cos 2\psi_i - C)^2 \qquad \text{Equation (4)}$$

where $I_i$ represents the light intensity observed when the angle of orientation Ψ of the axis of polarization satisfies. Ψ=Ψi.

As there are three unknown parameters a, b and C, at least three images with different polarized light intensities, of which the axes of polarization are defined by at least three different angles of orientation Ψ (i.e., N≧3), should be prepared to determine those three parameters.

Using the sinusoid approximating section 102 shown in FIG. 1, a sinusoidal function approximation is carried out on a pixel-by-pixel basis, thereby determining A, B and C.

Figure 5:
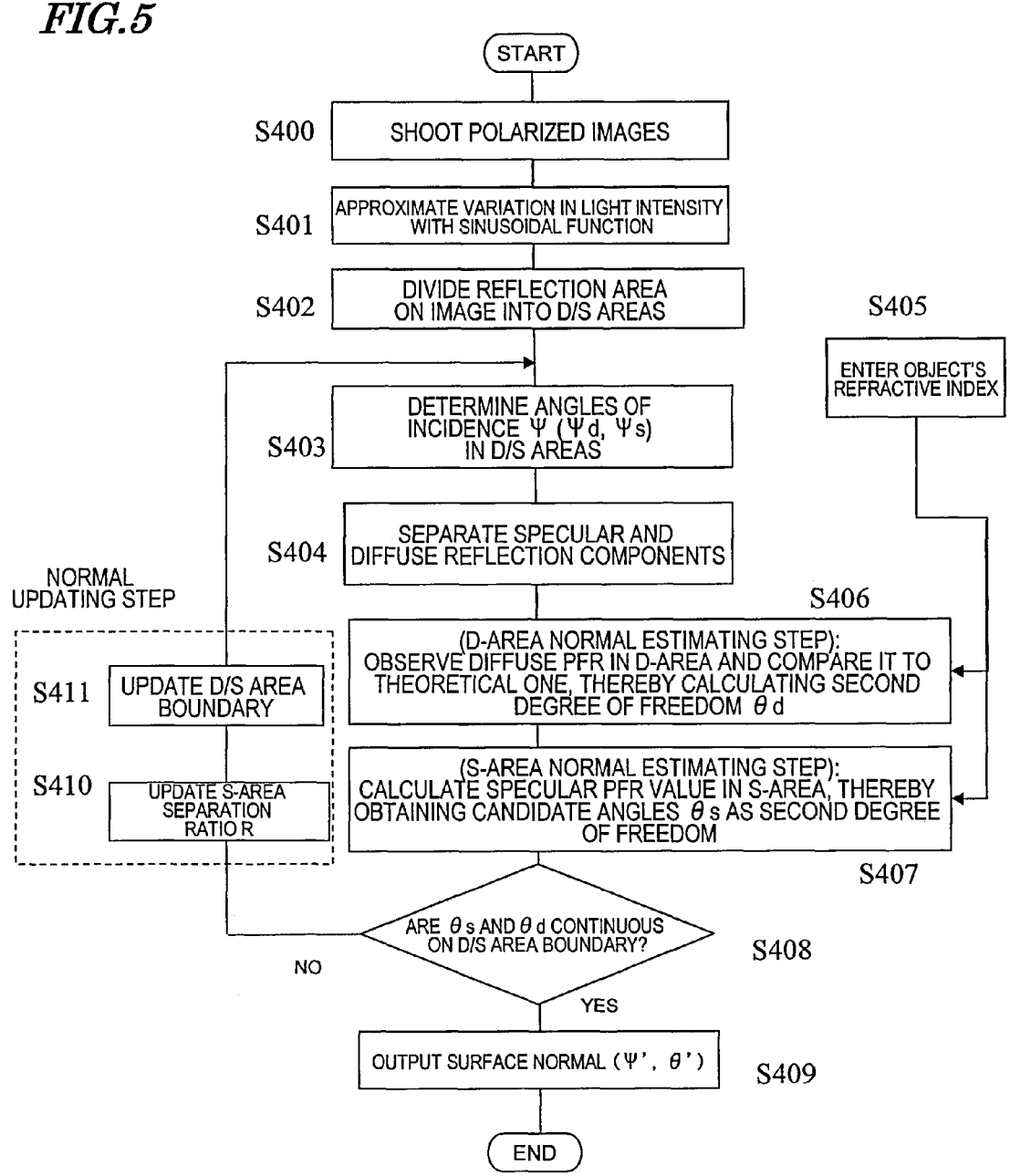
FIG. 5 is a flowchart showing how the image input apparatus of the first preferred embodiment of the present invention operates.

The segmentation section 103 performs the processing steps S402 and S411 shown in FIG. 5. The specular/diffuse component separating section 104 performs the processing steps S404 and S410 shown in FIG. 5. And the object's refractive index information database 105 performs the processing step S405 shown in FIG. 5.

The normal estimating section 110 performs the processing steps S403, S406 and S407. The normal updating section 108 performs the processing step S408. And the shape output section 109 performs the processing step S409.

Hereinafter, it will be described with reference to the flowchart of FIG. 5 exactly how the apparatus shown in FIG. 1 operates.

First, in Step S400, a number N of polarized images are shot. Next, in Step S400, the numerical values A, B and C of Equation (1) are obtained as described above, thereby approximating a variation in light intensity between the N polarized images with a sinusoidal function. As a result of this processing step, noise can be reduced to the point that sufficiently high precision can be achieved even with a small number of (e.g., N=4) polarized images. This processing step S401 is performed by the sinusoid approximating section 102 shown in FIG. 1.

Next, in Step S402, each of those images is spatially divided into two areas based on this result. That is to say, the respective pixels are separated into D- and S-areas. The D-area is an area where diffuse reflection of the object is prevalent, while the S-area is an area where specular reflection of the object is prevalent. To be exact, there are only diffuse reflection components of the object in the D-area, while not only diffuse reflection components but also specular reflection components are present in the S-area.

It has been widely known that the polarization phenomenon occurs not just in a specular reflection area but also in a diffuse reflection area. The degree of polarization is greater in the specular reflection area than in the diffuse reflection area except for occluding edges. The specular reflection area and the diffuse reflection area need to be handled quite separately from each other because physical phenomena occurring in those two areas are quite different from each other and because the relation between polarization information and an incident plane and the relation between the polarization information and the angle of incidence are totally different in those two areas.

Figure 6:
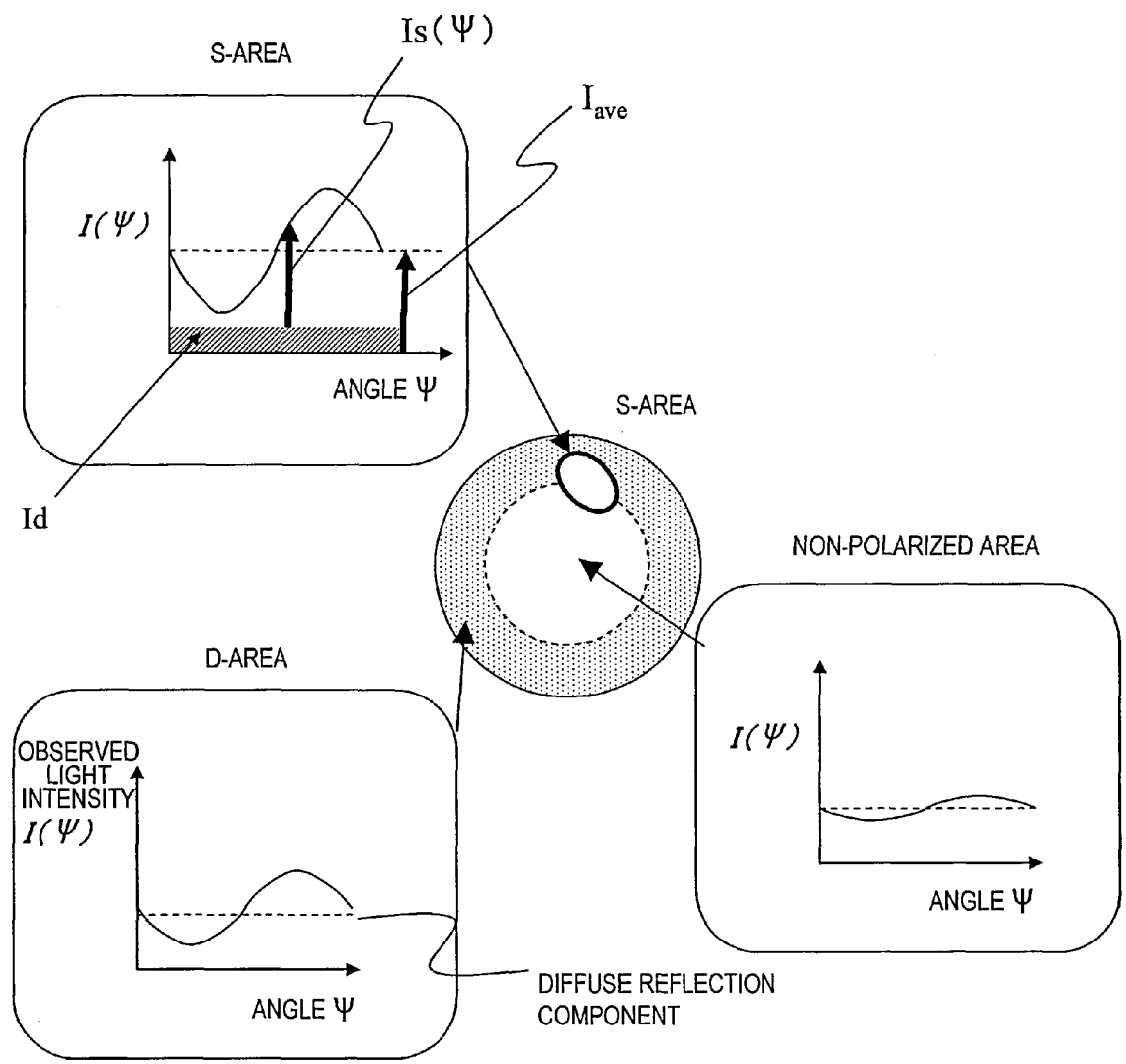
FIG. 6 is a schematic representation showing how to segment a reflection area.

FIG. 6 illustrates a ball-like object. The surface of this ball is divided into a D-area, an S-area and a non-polarized area.

The light intensity in the D-area consists of only diffuse reflection components. Since these diffuse reflection components are polarized, a variation in light intensity is observed according to the angle of orientation Ψ of the axis of polarization. The greater the angle formed between the viewing vector and the surface normal, the greater the degree of this variation (i.e., the degree of polarization). That is why in the occluding edge portions of the object, the degree of polarization increases. In FIG. 6, the peripheral portion of the object is included in the D-area.

On the other hand, the light intensity in the S-area would be a combination of very bright specular reflection components and relatively dark diffuse reflection components. Since the S-area is distant from the occluding edges, the light intensity does not vary so much due to the polarization caused by the diffuse reflection components. For that reason, in FIG. 6, the diffuse reflection components in the S-area are shown as having a substantially constant value that does not depend on the angle of orientation Ψ of the axis of polarization.

It should be noted that the non-polarized area is produced either when the polarization is canceled due to an overlap of the D- and S-areas that have a phase difference of 90 degrees or when the respective angles are defined so as to produce no polarization at all from the beginning present inventors shot an actual object with a 16-bit high dynamic range (HDR) camera and then made an approximation with a sinusoidal function, thereby obtaining maximum (MAX) and minimum (MIN) values of light intensities in a situation where the angles of orientation Ψ of the axis of polarization were changed in the D- and S-areas.

The values shown in the following Tables 1 and 2 were obtained by shooting the same object (which was a plastic ball in this example) with the positions of the illumination source changed. Specifically, in the example shown in Table 1, the average light intensity and degree of polarization were greater in the S-area than in the D-area. On the other hand, in the example shown in Table 2, the average light intensity in the S-area was greater than in the D-area but the degree of polarization was smaller in the S-area than in the D-area. Such a phenomenon will occur when the illumination direction is close to the camera viewpoint because the specular reflection does not cause so much polarization in that case.

TABLE 1

| Location | MAX intensity | MIN intensity | Average intensity = (MAX + MIN)/2 | Degree of polarization = (MAX − MIN)/ (MAX + MIN) |
|---|---|---|---|---|
| D-area 1 | 5,600 | 4,200 | 4,900 | 0.158 |
| D-area 2 | 7,200 | 5,500 | 6,350 | 0.137 |
| S-area 1 | 31,000 | 16,000 | 23,500 | 0.33 |
| S-area 2 | 18,000 | 13,000 | 15,500 | 0.177 |

TABLE 2

| Location | MAX intensity | MIN intensity | Average intensity = (MAX + MIN)/2 | Degree of polarization = (MAX − MIN)/ (MAX + MIN) |
|---|---|---|---|---|
| D-area 1 | 820 | 600 | 710 | 0.153 |
| D-area 2 | 1,000 | 800 | 900 | 0.126 |
| S-area 1 | 2,800 | 2,650 | 2,750 | 0.026 |

Figure 7:
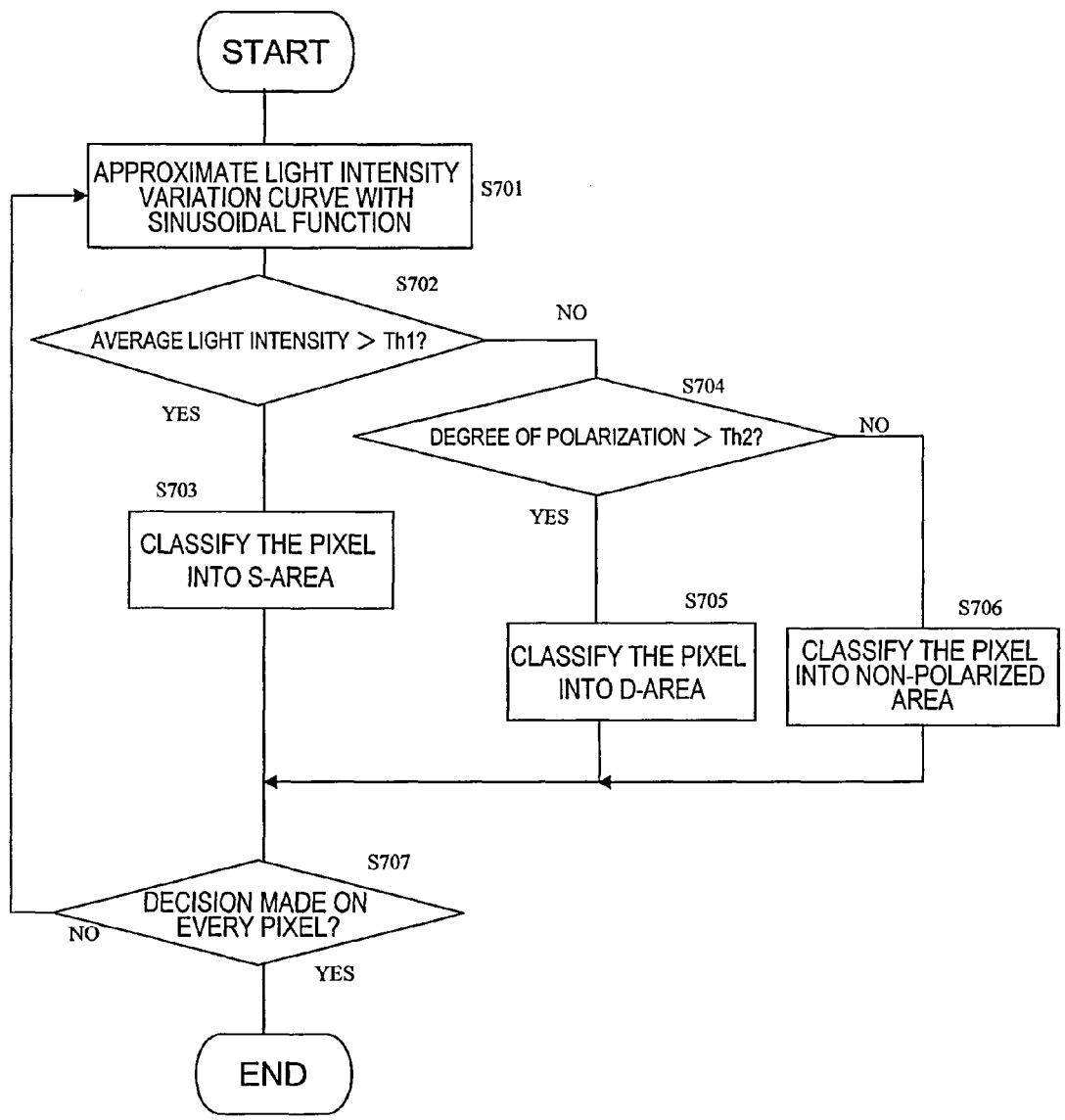
FIG. 7 is a flowchart showing how the segmentation section operates.

Next, a specific area division method will be described with reference to FIG. 7.

First, in Step S701, attention is paid to a particular pixel and a curve representing its light intensity variation is approximated with a sinusoidal function. More specifically, the segmentation section 103 gets the values A, B and C (see FIG. 4), which have been determined by the sinusoid approximating section 102 shown in FIG. 1, from the sinusoid approximating section 102.

Next, in Step S702, it is determined whether or not the average light intensity is greater than a constant threshold value Th1. If the average light intensity >Th1, the process advances to Step S703, in which that pixel is classified into the S-area. As the average light intensity is generally higher in a specular reflection area than in a diffuse reflection area, the area of a given pixel is determined by its average light intensity in this preferred embodiment. In the example shown in Table 1, Th1 is set to be 10,000. On the other hand, in the example shown in Table 2, Th2=2,000.

If it has been determined in Step S702 that the average light intensity >Th1 is not satisfied, then the process advances to Step S704, in which the degree of polarization is calculated and it is determined whether or not the degree of polarization is greater than the threshold value Th2. If the answer is YES, the process advances to Step S705, in which that pixel is classified into the D-area. On the other hand, if the degree of polarization is equal to or smaller than the threshold value Th2, then the process advances to Step S706, in which the pixel is classified into the non-polarized area. And this decision is made on every other pixel in Step S707. In the examples shown in Tables 1 and 2, Th2=0.1.

This series of processing steps is repeatedly performed in Step S707 until the classification is done on every pixel. These processing steps are performed by the segmentation section 103.

Now take a look at FIG. 5 again. After the processing step S402 has been performed as described above, the process advances to Step S403, in which an angle $\Psi d$ representing an incident plane in the S-area and an angle $\Psi s$ representing an emittance plane in the D-area are calculated with the light intensity variation curve, thereby obtaining ($\Psi d$, $\Psi s$).

Figure 8:
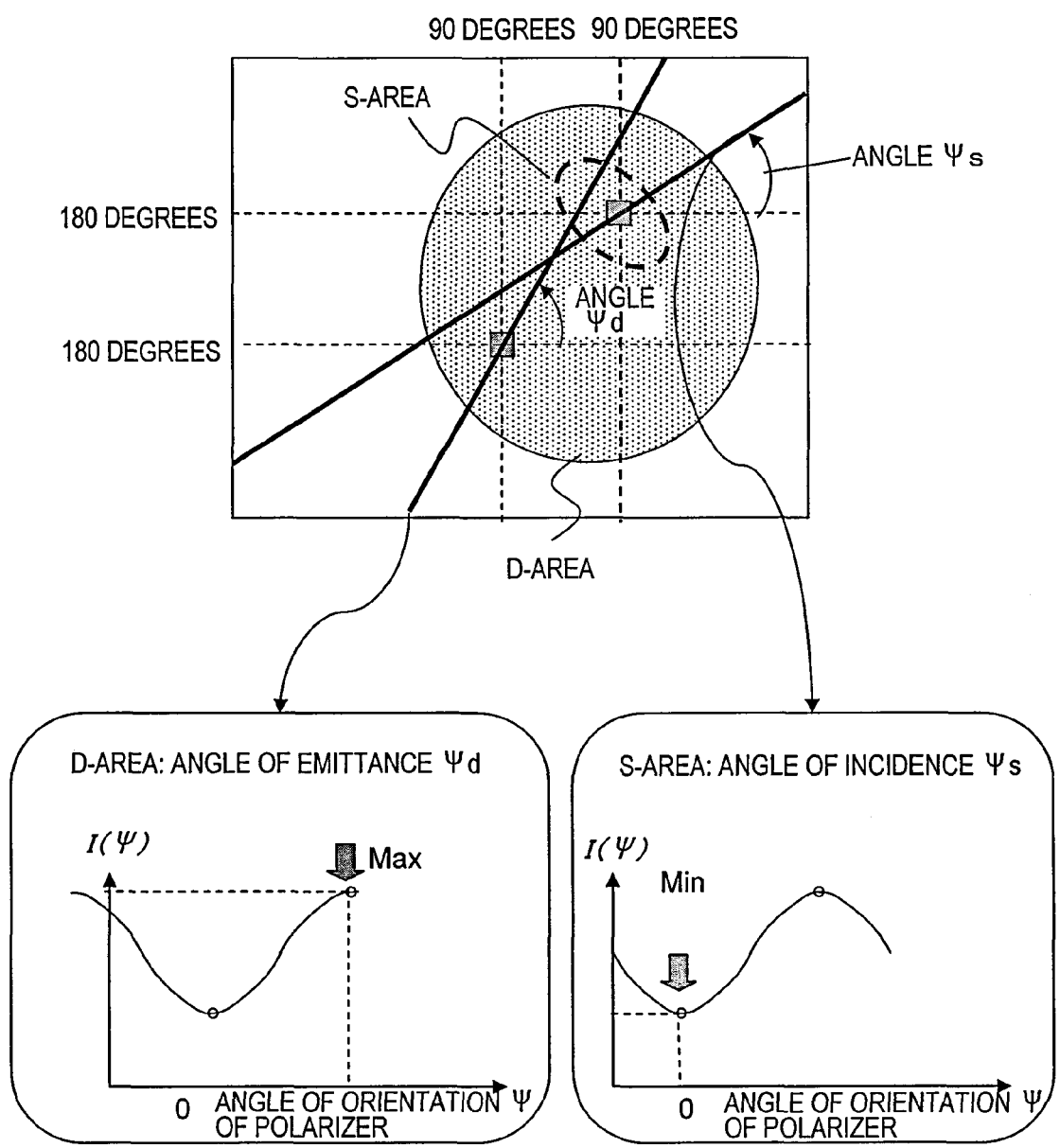
FIG. 8 shows how to determine the angles Ψ on an incident plane in an S-area and on an emittance plane in a D-area.

In the S-area, the light intensity variation due to polarization is caused mostly by the specular reflection. That is why $\Psi s$ is an angle at which the light intensity variation curve reaches its minimum value Min as shown in FIG. 8. On the other hand, since only diffuse reflection is produced in the D-area, $\Psi d$ is an angle at which the light intensity variation curve reaches its maximum value Max.

Figure 9:
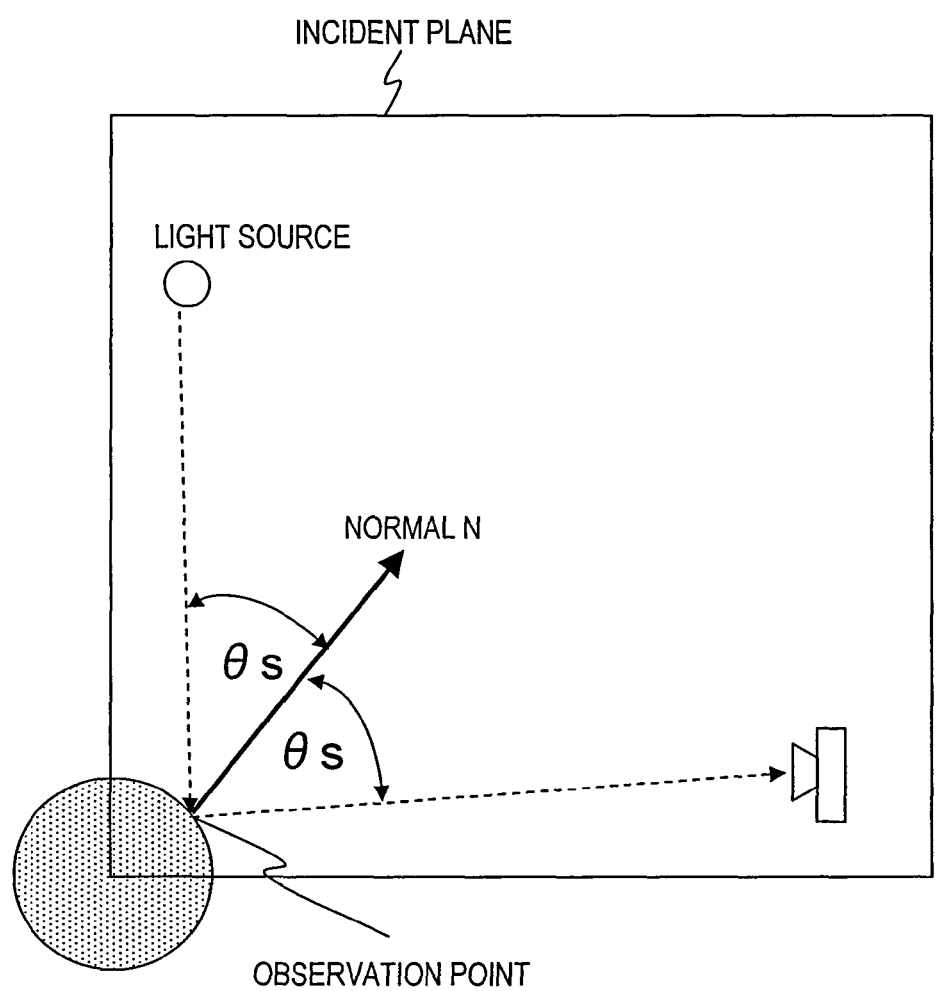
FIG. 9 shows an incident plane and the angle of incidence in an S-area.
Figure 10:
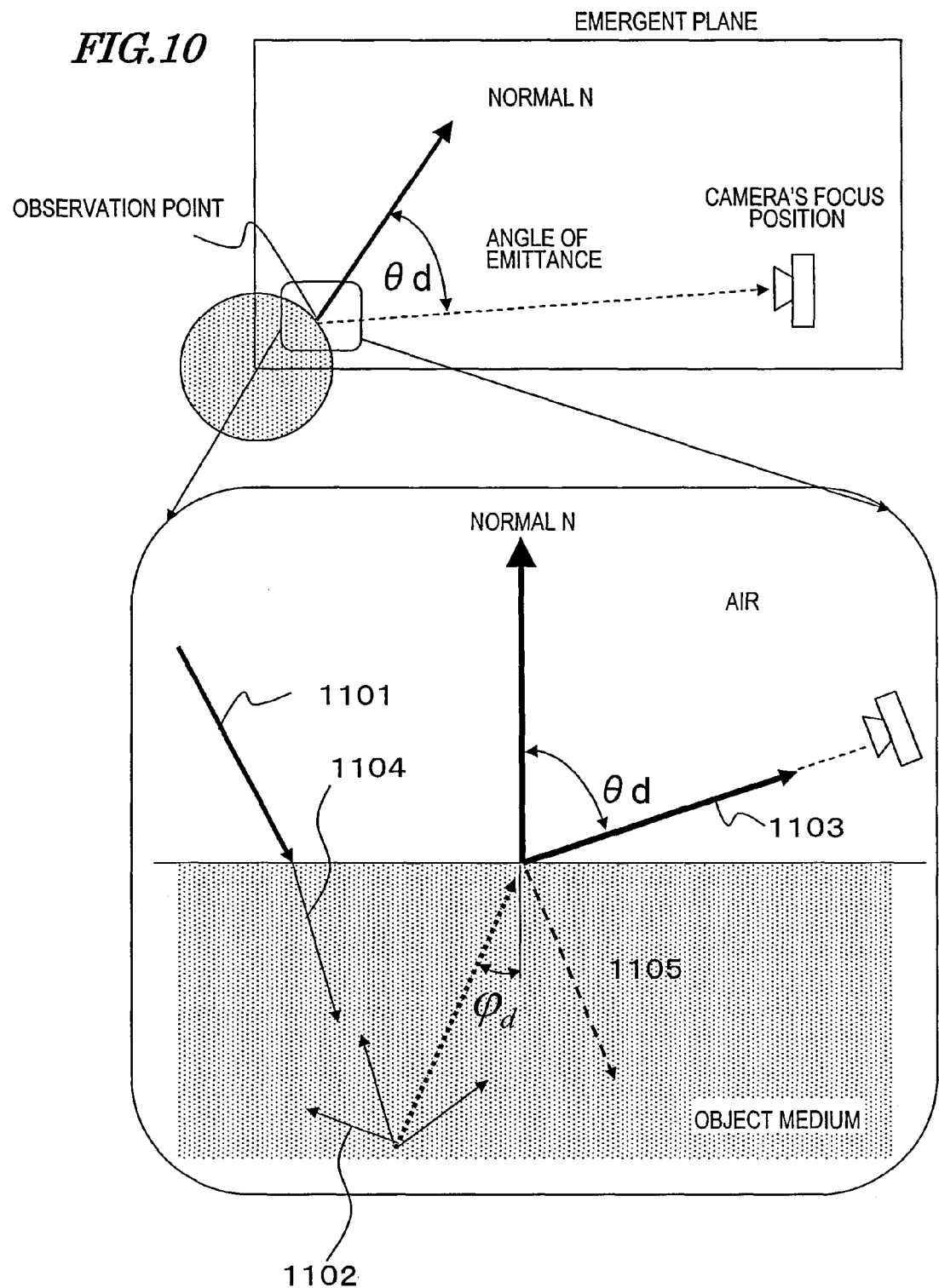
FIG. 10 shows an emittance plane and the angle of emittance in a D-area.

In this manner, of the two angles that define a surface normal, one angle that defines either an incident plane or an emittance plane can be determined. In FIG. 8, a plane defined by the angle $\Psi d$ (i.e., an emittance plane) and a plane defined by the angle $\Psi s$ (i.e., an incident plane) are each represented by a single line. In other words, in the S-area, in which specular reflection is prevalent, the angle $\Psi s$ represents an incident plane determined by the focus position of the camera, the observation point and the light source as shown in FIG. 9. On the other hand, in the D-area, in which diffuse reflection is prevalent, the angle $\Psi d$ represents an emittance plane determined by the focus position of the camera, the observation point and the surface normal as shown in FIG. 10. In FIG. 8, the line defined by the angle $\Psi s$ represents the incident plane as viewed from the focus position of the camera, while the line defined by the angle $\Psi d$ represents the emittance plane as viewed from the focus position of the camera. Since the line that connects the focus position of the camera to the observation point on the object is included in either the incident plane or the emittance plane, the incident and emittance planes can be represented by their respective lines on a two-dimensional image produced by capturing an image. The surface normal at the observation point is included in either the incident plane or the emittance plane. To determine the surface normal, the incident or emittance plane needs to be defined first, and then the direction of the surface normal in one of these planes should be determined.

Let's go back to FIG. 5 again. After the processing step S403 has been carried out as described above, the process advances to Step S404, in which the specular reflected and diffuse reflection components in the S-area are separated from each other. This separation means splitting a light intensity value itself into two components, not the spatial division that has been done on a pixel-by-pixel basis in the image space in Step S402. Specifically, first, a separation ratio R (where 0<R<1) is set on a pixel-by-pixel basis. Then, for a pixel in the S-area, I($\Psi$) is split into two terms (or components), which are the term Is($\Psi$) that depends on the angle $\Psi$ and the term Id that hardly depends on the angle $\Psi$, as represented by the following Equation (5). Is($\Psi$) represents the specular reflection component of light intensity and Iave in Equation (5) represents the average light intensity of the light intensity variation curve I($\Psi$) observed over a single period. Since Id and Is($\Psi$) are both values observed after the polarization filter has been passed, the light intensity is a half as high as a situation where no polarization filter is provided.

$$I_s(\psi)=I(\psi)-I_d=I(\psi)-I_{ave} \times R \qquad \text{Equation (5)}$$

This processing step S404 is performed by the specular/diffuse component separating section 104 shown in FIG. 1. After the processing step S404 has been carried out, the process advances to Steps S406 and S407 to perform normal estimation. Before these processing steps S406 and S407 are described, it will be described first how in principle a normal should be estimated based on a PFR value.

First of all, the PFR (polarization Fresnel ratio) value is the ratio defined between a parallel component Fp and an orthogonal component Fs, which define mutually different incident planes in a Fresnel reflection coefficient representing reflection by a dielectric material with a refractive index $\eta$, as disclosed in Patent Document No. 1 and Non-Patent Document No. 1. The FPR value is a piece of information about the degree of polarization of light. When the refractive index of an object is given, the relation between the PER value and the angle can be defined by theoretical formula. However, the PFR value behaves differently in cases of specular reflection and diffuse reflection. That is why two different PFR values are defined for specular reflection and diffuse reflection.

First, a theoretical formula that defines the PER value for the S-area (i.e., a Specular PFR value) and the method of calculating it based on an actual value will be described.

Supposing $\theta s$ represents the angle of incidence and $\eta$ represents the refractive index (more specifically, a relative refractive index that is calculated as the ratio of a refractive index n at the object's surface to the refractive index of 1 in a vacuum), the theoretical formula that defines the Specular PFR value is given by the following Equation (6):

$$SpecularPFR = \frac{F_S}{F_P} \qquad \text{Equations (6)}$$

$$F_S = \left[ \frac{\cos\theta s - \sqrt{\eta^2 - \sin^2\theta s}}{\cos\theta s + \sqrt{\eta^2 - \sin^2\theta s}} \right]^2$$

$$F_P = \left[ \frac{-\eta^2\cos\theta s + \sqrt{\eta^2 - \sin^2\theta s}}{\eta^2\cos\theta s + \sqrt{\eta^2 - \sin^2\theta s}} \right]^2$$

If the actual Specular PFR value can be obtained, the angle of incidence $\theta s$ can be calculated by substituting it into Equation (6). Also, once the angle of incidence $\theta s$ has been obtained, the surface normal can be determined because the angle $\Psi$ is already known.

Figure 11:
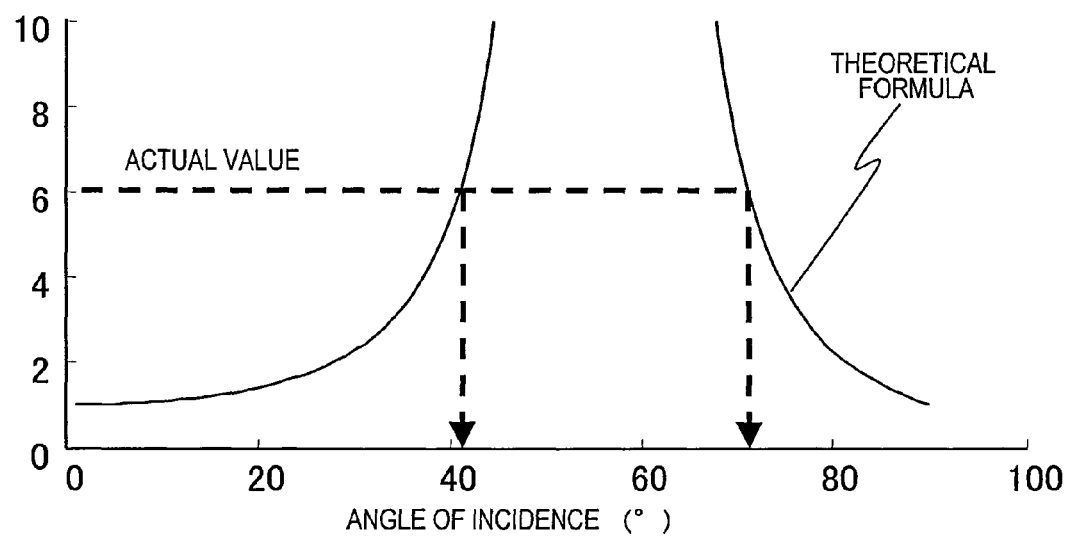
FIG. 11 shows a theoretical formula to be satisfied between the angle of incidence θs and the Specular PFR value.

FIG. 11 shows how the Specular PFR value (Fs/Fp) calculated by Equation (6) changes with the angle of incidence $\theta s$. In this example, the object is supposed to be made of plastic with a refractive index $\eta$ of 1.5. As shown in FIG. 11, if the angle of incidence $\theta s$ increases from 0 degrees through 90 degrees, the Specular PFR value draws such a curve that once increases to reach $\infty$ and then decreases again. That is why if one tries to obtain the angle $\theta s$ as a single solution by substituting an actual value into the theoretical formula, not a unique solution but two solutions will be obtained instead.

The result will be the same even if the refractive indices n are changed. To overcome such a problem, the method to be described later is adopted according to this preferred embodiment. Before that method is described, however, it will be described first how to measure the actual Specular PFR value.

The Specular PFR value is calculated based on a specular reflection component. The light intensity in the S-area is supposed to be observed as a composite value of the specular reflection component $Is(\Psi)$ that varies with the angle $\Psi$ and the diffuse reflection component $Id$ that does not depend on the angle $\Psi$ as shown in FIG. 6. For that reason, to obtain the actual Specular PFR value, only the specular reflection component $Is(\Psi)$ needs to be isolated from the light intensity measured. The $Is(\Psi)$ component isolated varies in a sinusoidal wave form and the ratio of its maximum value to its minimum value corresponds to the Specular PFR value. That is to say, the Specular PFR value can also be represented by the following Equation (7):

$$SpecularPFR = \frac{I_{S\_max}}{I_{S\_min}} \quad \text{Equation (7)}$$

Next, it will be described with reference to FIG. 10 what a Diffuse PFR value is. The Diffuse PFR value is defined herein to be a Fresnel reflection coefficient at an emittance plane when the incoming light leaves the object as diffuse reflected light. As shown in FIG. 10, the incident light 1101 that has come from the light source enters the object medium and then is scattered inside the medium in various directions as indicated by the azimuths 1102 to be non-polarized scattered light rays. Then, some of those non-polarized light rays leave the object medium, travels through the air, and then enters the camera as an emergent light ray 1103. This emergent light ray 1103 is the diffuse reflected light.

Some of the light rays 1104 that have been scattered in the object medium are split into light rays 1105 reflected inside the object medium and the emergent light rays 1103 to be refracted and then leave the object medium. That is why the degree of polarization of the emergent light ray can be represented using $1/\eta$ as the refractive index of the light ray that leaves the medium and then goes into the air. Suppose the angle of incidence on the object medium is $\phi d$ and the angle of emittance at the observation point is $\theta d$. In that case, if Equation (6) of Fresnel reflection is applied to the angle $\phi d$, the relation between the angle d and the Fresnel reflection coefficients Fp' and Fs' inside the object medium is represented by the following Equation (8), where the relation between $\phi d$ and $\theta d$ is defined by the Snell's law.

$$F'_S = \left[\frac{\cos\varphi_d - \sqrt{(1/\eta)^2 - \sin^2\varphi_d}}{\cos\varphi_d + \sqrt{(1/\eta)^2 - \sin^2\varphi_d}}\right]^2 \quad \text{Equations (8)}$$

$$F'_P = \left[\frac{-\eta^2\cos\varphi_d + \sqrt{(1/\eta)^2 - \sin^2\varphi_d}}{\eta^2\cos\varphi_d + \sqrt{(1/\eta)^2 - \sin^2\varphi_d}}\right]^2$$

$$\varphi_d = \sin^{-1}\left(\frac{\sin\theta_d}{\eta}\right)$$

The emergent light ray 1103 that is refracted at the object's surface and then goes into the air is obtained by subtracting the reflected light 1105 inside the object medium from the total energy that is supposed to be one. Therefore, the theoretical formula of the Diffuse PFR value can be given by the following Equation (9):

$$DiffusePFR = \frac{1 - F'_S}{1 - F'_P} \quad \text{Equation (9)}$$

In a situation where the degree of polarization of the diffused light is actually observed, all of the reflected light in the D-area is supposed to be diffused light. Thus, the Diffuse PFR value can be represented by actually measured values as defined by the following Equation (10):

$$DiffusePFR = \frac{I_{max}}{I_{min}} \quad \text{Equation (10)}$$

Figure 12:
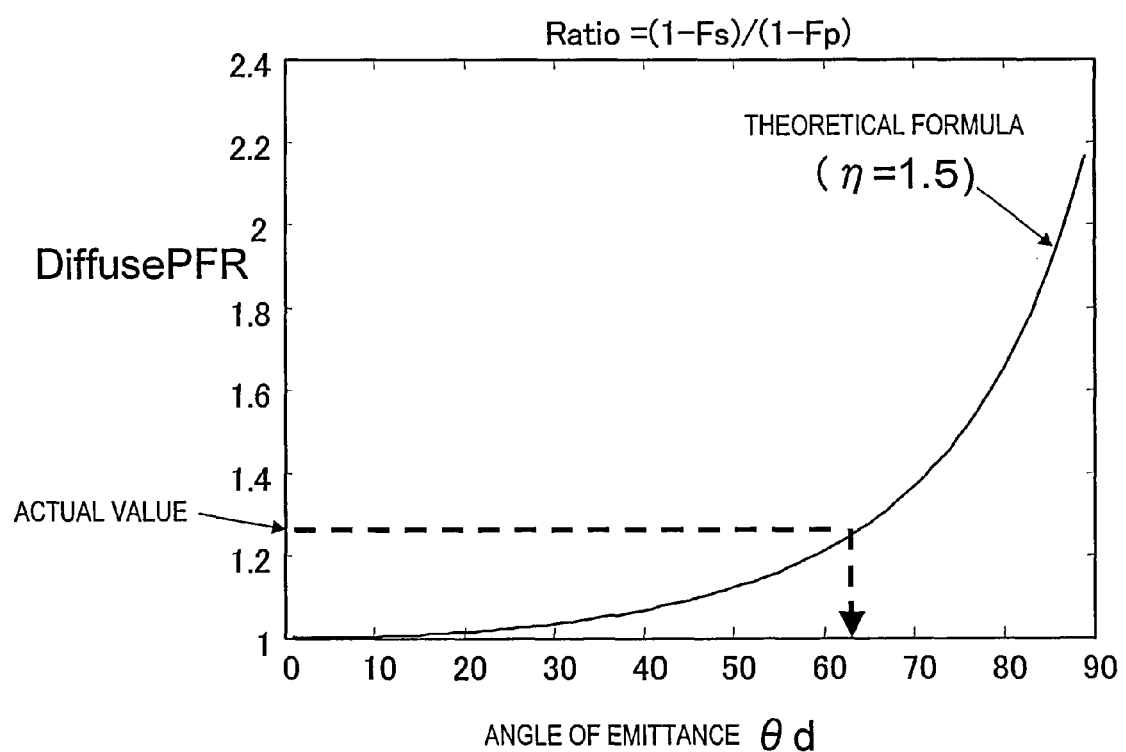
FIG. 12 shows a theoretical formula to be satisfied between the angle of emittance θd and the Diffuse PFR value.

FIG. 12 is a graph showing how the Diffuse PFR value represented by Equation (9) changes with the angle of emittance $\theta d$. In this example, the object is supposed to be made of plastic with $\eta=1.5$. As shown in FIG. 12, the Diffuse PFR value increases monotonically with the angle of emittance $\theta d$. If the object has a different refractive index $\eta$, then the curve will rise differently from the one shown in FIG. 12 but also monotonically irrespective of the refractive index $\eta$. That is why if the refractive index $\eta$ of the object is known, the angle of emittance $\theta d$ can be calculated as a unique value based on the Diffuse PFR value.

As shown in FIG. 6, in the D-area, every component of the reflected light can be regarded as a diffuse reflection component. That is why there is no uncertainty in the Diffuse PFR value calculated. Therefore, once the refractive index n of the object has been given, the angle of emittance $\theta d$ can be calculated with high reliability based on the actual Diffuse PFR value given by Equation (10).

Let's go back to FIG. 5 again. If the object's refractive index $\eta$ has been entered in Step S405, the theoretical formula represented by Equation (9) is fixed and the curve shown in FIG. 12 is obtained. In this case, the object's refractive index $\eta$ is supposed to be the same in both of the D- and S-areas.

In Step S406, D-area normal estimating processing step is carried out. Specifically, an actual Diffuse PFR value is calculated by Equation (10) based on actual Imax and Imin values obtained for the D-area. Once the actual Diffuse PFR value is known, the angle of emittance $\theta d$ can be obtained by reference to the curve shown in FIG. 12. As can be seen easily from FIG. 10, once this angle of emittance $\theta d$ is fixed, a surface normal to the emittance plane can be determined. As the angle $\Psi$ that defines the emittance plane has already been obtained in Step S403, the surface normal to the D-area can be determined as a unique value. This processing step is performed by the D-area normal estimating section 107 shown in FIG. 1.

Next, the process advances to Step S407 that is an S-area normal estimating processing step. In this processing step, a surface normal to the S-area is determined. Specifically, the angle of incidence $\theta s$ is calculated for the S-area based on the actual Specular PFR value. This processing step is carried out by the S-area normal estimating section 106 shown in FIG. 1. As already described with reference to FIG. 11, once the actual Specular PFR value has been obtained, the angle of incidence $\theta s$ can be calculated by substituting it into Equation (6). However, as there are two solutions, the processing step of choosing one of those two solutions needs to be done. To make this choice, information that has already been obtained about the surface normal to the D-area is used according to the present invention.

First, using the refractive index η as a known value, a theoretical formula is obtained by Equation (6) for the angle of incidence θs and the Specular PFR value. As shown in FIG. 11, two solutions are obtained as the angle of incidence θs associated with the actual Specular PFR value. In the following description, those two solutions will be referred to herein as "θs candidates".

Once those θs candidates have been obtained, the process advances to Step S408, in which the continuity of θd and θs that have been obtained in the processing steps S406 and S407, respectively, is evaluated. A surface normal to an object shifts according to the location at the surface. However, if the surface shape changes gently, a number of surface normals that are located close to each other all point substantially the same direction. For that reason, in an area where the D- and S-areas are adjacent to each other, a surface normal to the D-area and a surface normal to the S-area tend to be continuous with each other. That is why of the two surface normal candidates determined by the two θs candidates of the S-area, one surface normal that is located closer to the surface normal to the D-area should be selected as the surface normal to the S-area. The degree of continuity between the surface normals to the D- and S-areas can be evaluated by the difference between the angles θs and θd. In this example, the degree of continuity is evaluated by the following evaluation formula (11):

$$\text{if } |\theta_s - \theta_d| < Th3 \text{ then} \qquad \text{Formula (11)}$$

continuous
else
discontinuous

Of the two solutions (i.e., θs candidates) that have been obtained in Step S407, one solution that satisfies the continuity requirement defined by Formula (11) is chosen. In this case, if the continuity requirement is satisfied, the process advances to Step S409. In this processing step, a table that stores data about the incident planes and the angles of incidence that have been obtained in combination (Ψs, θs) for respective pixels in the S-area and a table that stores data about the emittance planes and the angles of emittance that have been obtained in combination (Ψd, θd) for respective pixels in the D-area are merged with each other, thereby obtaining a surface normal (Ψ, θ) at each pixel of a given image (i.e., a surface normal image with two components).

On the other hand, if the continuity requirement is not satisfied in Step S408, the reason will be one of the following two:

1) The specular reflection component separation ratio R that was set in Step S404 was so inappropriate that a wrong Specular PFR value was calculated; or
2) The D/S area division that was done in Step S402 was so inappropriate that a normal that should have been classified into the S- or D-area was calculated by a wrong method.

Thus, if the continuity requirement is not satisfied in Step S408, those values are updated again and a normal updating processing step is carried out repeatedly. Specifically, in Step S410, the Specular PFR value is updated. More specifically, the R value is slightly varied in the plus and minus directions, thereby updating the R value slightly such that θs on the boundary becomes closer to θd. In this case, if the continuity of Id on the boundary is taken into consideration, the convergence can be reached more quickly. Portions (a) and (b) of FIG. 13 schematically illustrate this converging process. As shown in portion (a) of FIG. 13, in the initial state, quite different surface normals are obtained in the D- and S-areas. After the convergence is achieved, however, the S-area has changed its ranges and the normals to the S- and D-areas have shifted continuously as shown in portion (b) of FIG. 13. As a result, surface normals to the object can be obtained globally.

Look at FIG. 5 again. Once the update is done in Step S410, the process advances to Step S411 of updating the D/S area boundary, which is determined by the two threshold values Th1 and Th2 shown in FIG. 7. If the threshold value Th1 is increased, the S-area will have a decreased area. Thus, the threshold value Th1 is slightly varied in the plus and minus directions, thereby updating the threshold value Th1 slightly such that θs on the boundary becomes closer to θd.

When the updating processing step S411 shown in FIG. 5 is finished, the process goes back to the processing step S403 again. After that, the same series of processing steps S403, S404, S406 to S408, S410 and S411 are repeatedly carried out a required number of times until the continuity requirement is satisfied in Step S408.

When the continuity requirement is satisfied, the process advances to Step S409, in which a surface normal (Ψ, θ) is calculated as an angle to be defined by projecting, onto a plane the camera coordinate system, angle information about the combination of the incident plane and angle of incidence (Ψs, θs) that have been obtained in the S-area and the combination of the emittance plane and angle of emittance (Ψd, θd) that have been obtained in the D-area. This transformation is equivalent to correcting θ as shown in FIGS. 14(a) and 14(b). That is to say, θ defined as an angle formed between the normal and the viewing vector is transformed into an angle according to the camera coordinate system using the viewing vector.

The relation between a pixel location (x, y) (or pixel) on the image shown in FIG. 14(a) and an actual size location ($x_f'$, $y_f'$) (mm) on an image capture device that is called an "image coordinate system" is represented by the following Equations (12) using the lens optical axis location ($C_x$, $C_y$) (pixel) on the image, the size of a single pixel (dx, dy) (mm) on the image capture device and strain parameters $\kappa_1$ and $\kappa_2$ representing the strain of the lens:

$$\begin{cases} x_f(\text{mm}) = (x - C_x) \cdot dx \\ y_f(\text{mm}) = (x - C_y) \cdot dy \end{cases} \qquad \text{Equations (12)}$$

$$r(\text{mm}) = \sqrt{(x_f)^2 + (y_f)^2}$$

$$D_x(\text{mm}) = x_f(\kappa_1 r^2 + \kappa_2 r^4)$$

$$D_y(\text{mm}) = y_f(\kappa_1 r^2 + \kappa_2 r^4)$$

$$\begin{cases} x_f'(\text{mm}) = x_f + D_x \\ y_f'(\text{mm}) = y_f + D_y \end{cases}$$

where (dx, dy) (mm) can be calculated based on catalog values, for example, and ($C_x$, $C_y$), $\kappa_1$, $\kappa_2$ and f can be known by making a so-called "camera calibration" (see, for example, Roger Y. Tsai, "An Efficient and Accurate Camera Calibration Technique for 3D Machine Vision", Proceedings of IEEE Conference on Computer Vision and Pattern Recognition, Miami Beach, Fla., 1986, pp. 364-374). These parameters do not change even if the position or the direction of the image capture device changes. Such parameters are called "camera's internal parameters".

In this preferred embodiment, camera calibrations are made before shooting is started, thereby determining the camera's internal parameters including ($C_x$, $C_y$), (dx, dy), f, $\kappa_1$, and $\kappa_2$. These parameters may be default ones that have already been set when the image capture device is purchased. Also, if the camera does not have a fixed focus but can make zooming, then focus lengths f in the zoom mode are preferably determined in advance and an appropriate one of them is preferably selected when needed. Then the focus length f selected is preferably stored along with the image shot. The elevation angle $\alpha$ in the camera coordinate system, associated with the pixel location (x, y) at which a normal should be defined as shown in FIG. 12, can be given by the following Equation (13) using the focal length f of the image capture device:

$$\alpha = \tan^{-1}\left(\frac{\sqrt{x_f'^2 + y_f'^2}}{f^2}\right) \qquad \text{Equation (13)}$$

That is why the surface normal at the pixel coordinate location (x, y) can be obtained by the following Equation (14) using a spherical coordinate system on the camera coordinate system and output:

$$N(x,y)=(\psi'(x,y),\theta'(x,y))=(\psi,\theta-\alpha) \qquad \text{Equation (14)}$$

The information represented by this Equation (14) is object's surface normal information, which corresponds to object's shape output.

FIGS. 15 to 17 are photographs showing samples of a group of polarized images that were actually used in this preferred embodiment and an object's surface normal shape that was output at last.

In this example, the object was a wood mask. This object was shot with a non-polarizing illumination source while rotating the polarization filter thereof, thereby obtaining four polarized images. Specifically, the four polarized images shown in FIG. 15 were used in this example and had angles of orientation Ψ of the axis of polarization of 0, 45, 90 and 135 degrees, respectively.

These four polarized images are obtained by the polarized image capturing section 101 shown in FIG. 1 and then input to the sinusoid approximating section 102. The rest of the processing will be performed just as already described with reference to FIGS. 1 and 5. In this manner, surface normal images that have two angular parameters (Ψ', θ') corresponding to polar coordinates in a camera coordinate system are produced eventually. FIG. 16 shows the surface normal images. In producing the surface normal images shown in FIG. 16, Ψ' (which falls within the range of −180 degrees through 180 degrees) is allocated to 0 through 255 and θ' (which falls within the range of 0 degrees through 180 degrees) is allocated to 0 through 128.

Embodiment 2

Hereinafter, a second preferred embodiment of an image input apparatus according to the present invention will be described.

First, look at FIG. 18, which is a block diagram illustrating an image input apparatus as a second preferred embodiment of the present invention.

The image input apparatus of this preferred embodiment is different from the counterpart of the first preferred embodiment described above in that this apparatus further includes a light source output section 1501 and a specular/diffuse reflected image output section 1502. Besides, the continuity evaluating section 1503 also operates differently. However, the other components are basically the same as the ones already described.

According to this preferred embodiment, not just the shape information of the object but also the angle of the light source that illuminates the object can be obtained. In addition, an image in which the light intensity component of the object has been separated into a specular reflection component and a diffuse reflection component can also be output.

Techniques for estimating an illumination source has already developed a field of research called "inverse lighting", which is usually carried out with a special type of sensor. In contrast, according to this preferred embodiment, the object's shape and the existence of its light source can be both estimated without using any additional sensor, thus allowing the user to apply computer graphics processing.

FIG. 19 is a schematic representation showing how to estimate a light source. At an observation point on the object where specular reflection (regular reflection) is produced (i.e., in the S-area), the direction vector L of parallel light coming from the light source 1601, a surface normal vector N and a viewing vector V from the camera 201 satisfy the following Equation (15):

$$L=(L_1(x,y),L_2(x,y))=-V+2(V\cdot N)N \qquad \text{Equation (15)}$$

The vectors N and V are calculated in a camera coordinate system, of which the origin of coordinates is defined by the focal point of the same camera. By using this Equation (15), the parallel light source vector L can be estimated based on the vectors N and V.

As described above, as for the normal in the S-area, initially there are two candidates (or solutions), one of which should converge to the best solution by making iterative calculations. That is why initially there are a number of vectors N for those multiple solutions as shown in portion (a) of FIG. 20, and therefore, a number of light sources are estimated in the beginning. However, as shown in portion (b) of FIG. 20, as the vectors N converge, the light source vector also converges to the best solution.

The light source output section 1501 of this preferred embodiment is provided with information about the vectors N and V in the S-area, which have been figured out by the S-area normal estimating section 106, and supposes the parallel light based on the geometry of regular reflection described above, thereby calculating the direction of the light source.

Next, it will be described with reference to FIG. 21 how the specular/diffuse reflected image output section 1502 operates.

Using the outputs of the segmentation section 103 and the specular/diffuse component separating section 104, the specular/diffuse reflected image output section 1502 separates the object's image captured with light intensity into an image consisting of specular reflection components and an image consisting of diffuse reflection components. This processing needs to be done when an actual object is used as a model for computer graphics and contributes to getting a surface reflection property.

The area division result 1801 that has been obtained through the D/S division operation by the segmentation section 103 is basically just binary information. Thus, even if this result is presented as an image, the surface reflection property cannot be known. To know the property, the light intensities added together need to be separated from each other by the best possible method as shown in FIG. 21 so that a specular reflected image 1802 and a diffuse reflected image 1803 are produced from the image 1801. To get this separation done, according to this preferred embodiment, information about the separation ratio R that has been estimated by the specular/diffuse component separating section 104 is used.

Hereinafter, the separation method will be described with reference to FIGS. 22(a) through 22(c), which illustrate a method for making the best separation while maintaining the continuity of diffuse reflection components in the S- and D-areas. In the graphs shown in FIGS. 22(b) and 22(c), the ordinate represents the average light intensity, which is obtained by averaging the light intensities observed on polarized images according to the angle of the polarizer, while the abscissa represents an X-coordinate on an image, for example.

In the S-area, the separation ratio R given by Equation (5) is determined on a pixel-by-pixel basis. That is to say, in each pixel of the S-area, the pixel can be separated by Equation (5) into the specular reflection component 1901 and the diffuse reflection component 1902 shown in FIG. 22(b).

In the example illustrated in FIG. 22(b), even within the S-area, the specular reflection component 1901 and the diffuse reflection component 1902 are not continuous with each other between the pixels. Also, in FIG. 22(b), on the D/S boundaries 1903 and 1904, the diffuse reflection components 1902 and other components change discontinuously.

In this preferred embodiment, not just to determine the surface normal but also to make the diffuse reflection components 1902 satisfy the continuity requirement on the D/S boundaries, the results of evaluation made by the continuity evaluating section 1503 are used as additional data. That is to say, the continuity evaluating section 1503 of this preferred embodiment not just performs the processing step S408 that is carried out by the normal updating section 108 shown in FIG. 1 but also evaluates the degree of continuity between the diffuse reflection component $I_{d\_area(S)}$ in the S-area and the diffuse reflection component $I_{d\_area(D)}$ (i.e., light intensity itself) in the D-area on the D/S boundaries as represented by the following Formula (16):

$$\text{if } |I_{d\_Area(S)} - I_{d\_Area(D)}| < Th4 \text{ then} \qquad \text{Formula (16)}$$

continuous
else
discontinuous

In this case, if the continuity requirement is satisfied, the specular/diffuse reflected image output section 1502 outputs separated images with different light intensities. The diffuse reflection components Id(x, y) and Is(x, y) are converted, using the averages Iave(x, y) of the light intensity values observed in the D- and S-areas at the image coordinates (x, y) with respect to the angles of orientation Ψ by the polarized image capturing section 101, by the following Equations (17):

$$I_d(x, y) = \begin{cases} I_{ave}(x, y) \times R(x, y) & \text{in } S\text{-area} \\ I_{ave}(x, y) & \text{in } D\text{-area} \end{cases} \qquad \text{Equations (17)}$$

$$I_S(x, y) = \begin{cases} I_{ave}(x, y) \times [1 - R(x, y)] & \text{in } S\text{-area} \\ 0 & \text{in } D\text{-area} \end{cases}$$

If the continuity evaluating section 1503 does not satisfy the continuity requirement, the reason will be one of the following two:

1) The specular reflection component separation ratio R(x, y) that was set tentatively was so inappropriate that a wrong Specular PFR value was calculated; or 2) The D/S area division that was done tentatively was so inappropriate that a normal that should have been classified into the S- or D-area was calculated by a wrong method.

That is why as is done in the first preferred embodiment, these values may be updated to enter the iterative loop. Examples of output images obtained from the specular/diffuse reflected image output section 1502 according to this preferred embodiment include not only the images that have been mentioned for the first preferred embodiment but also the diffuse reflected image Id(x, y) and the specular reflected image Is(x, y) shown in FIG. 17. It should be noted that information about the location of the light source is provided by the light source output section 1501.

Figure 22:
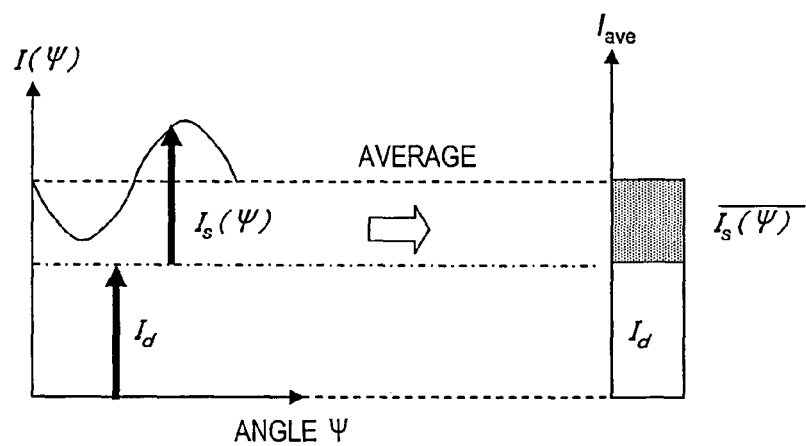
Figure 22:
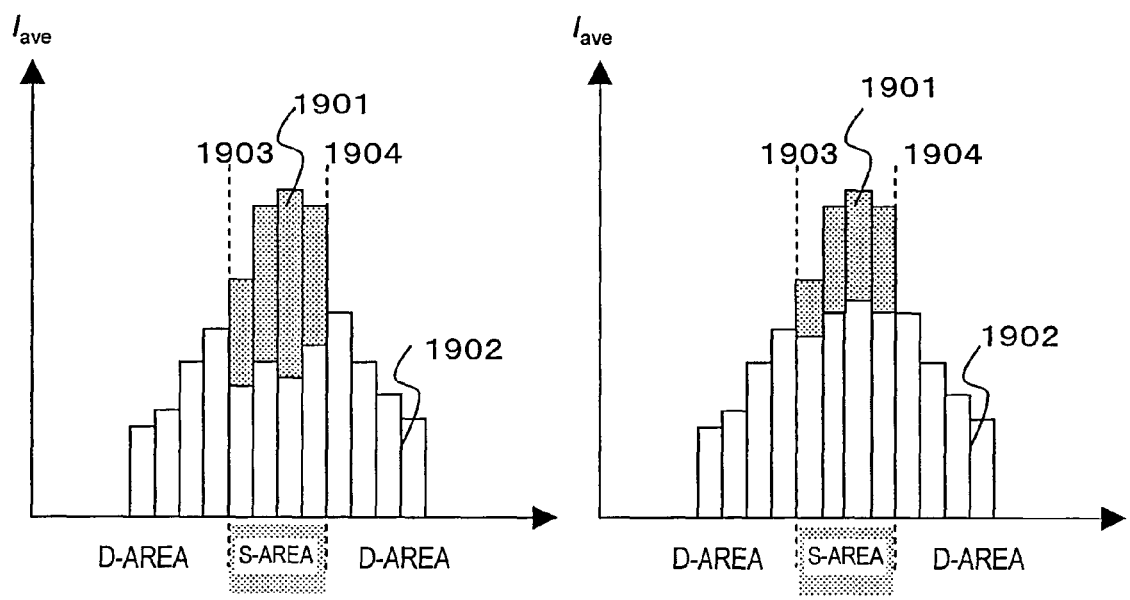

In the example illustrated in FIG. 22, the best D/S separation ratio R is determined by requiring, as an evaluation function, that the specular reflection component 1901 and the diffuse reflection component 1902 are continuous with each other on the D/S boundaries 1903 and 1904. Optionally, such a method may be extended so as to process color images. In that case, the continuity requirement would constitute a stronger constraint, thus contributing to realizing separation with higher accuracy. Then the best separation ratio R just needs to be determined such that the color diffuse reflection components in the S- and D-areas satisfy the continuity requirement. Such a modified example is also supposed to be included in this preferred embodiment. In that case, the evaluation formula is represented by the following Formula (18):

$$\text{if } |R_{d\_Area(S)} - R_{d\_Area(D)}| + |G_{d\_Area(S)} - G_{d\_Area(D)}| + |B_{d\_Area(S)} - B_{d\_Area(D)}| < Th5 \text{ then} \qquad \text{Formula (18)}$$

continuous
else
discontinuous

Embodiment 3

FIG. 23 is a block diagram illustrating a third preferred embodiment of an image input apparatus according to the present invention.

An image input apparatus as the third preferred embodiment of the present invention can process color images. The apparatus of this preferred embodiment can also output information about the object's shape, the angle of the light source that illuminates the object, and a specular reflected image and a diffuse reflected image of the object just like the counterpart of the second preferred embodiment described above.

The apparatus of this preferred embodiment includes a color polarized image capturing section 2001, segmentation and adjusting section 2002, a Red processing section 2003, a Green processing section 2004, a Blue processing section 2005, a Red specular/diffuse reflected image output section 2006, a Green specular/diffuse reflected image output section 2007, a Blue specular/diffuse reflected image output section 2008, a normal adjusting section 2009, an object's refractive index information database 105, a light source output section 1501 and a shape image output section 1502.

To the processing sections for the respective colors, Red polarized image data 2011, Green polarized image data 2012 and Blue polarized image data 2013 are supplied from the color polarized image capturing section 2001, and Red refractive index data 2017, Green refractive index data 2018 and Blue refractive index data 2019 are also supplied from the object's refractive index information database 105. The normal adjusting section 2009 of this preferred embodiment imposes a constraint that will make the normals, obtained for the respective colors of red, green and blue, agree with each other and will perform required processing repeatedly until those normals completely agree with each other.

The color polarized image capturing section 2001 is obtained by modifying the camera shown in FIG. 2 or 3 so as to shoot color images, and shoots a number N of polarized images in each of the three primary colors of red, green and blue.

In this preferred embodiment, the Red, Green and Blue processing sections 2003, 2004 and 2005 perform three different types of processing for the three different colors. The image processing about colors is also done independently of each other. Thus, the Red, Green and Blue specular/diffuse reflected image output sections 2006, 2007 and 2008 output a specular reflected image and a diffuse reflected image separately on a color-by-color basis.

Meanwhile, the processing on the object's shape and the processing about the light source are performed in common for the respective colors. That is why it is necessary to match the results of the three lines of processing that have been done for the three different colors. This role is played by the segmentation and adjusting section 2002 and the normal adjusting section 2009.

FIG. 24 is a block diagram showing the configuration of the Red processing section 2003. The configuration shown in FIG. 24 is substantially the same as the one shown in FIG. 18. In the configuration shown in FIG. 24, the Red polarized image data 2011 and the Red refractive index data 2017 are input to segment the reflection area. A reflection area adjusting signal 2010 imposes another constraint that the D/S area boundary defined by the segmentation section 103 should be the same for all three colors of Red, Green and Blue. Also, a Red normal adjusting signal 2014 puts another constraint that the normal obtained should be the same for all three colors of Red, Green and Blue. The other components operate in the same way as the counterparts that have already been described with reference to FIG. 18, and the description thereof will be omitted herein. The output images of the image input apparatus of this preferred embodiment are basically the same as the ones of the second preferred embodiment except that those images are represented in colors according to this preferred embodiment.

FIG. 25 shows exemplary data forms or image formats for use to store the information or data that has been output from the image input apparatus of this preferred embodiment.

The image format 2202 of the data that has been output from the image input apparatus of this preferred embodiment always includes the following four sorts of information, no matter whether it is a still picture or a moving picture:

1. light source information L: $L_1(x, y)$, $L_2(x, y)$
2. specular reflection peak chromaticity information: $(R_{peak}/Y_{Peak}, B_{Peak}/Y_{Peak})$
3. monochrome specular reflected image: $Y_s(x, y)$
4. color diffuse reflected image: $Rd(x, y)$, $Gd(x, y)$ and $Bd(x, y)$
5. surface normal image: $\Psi'(x, y)$, $\theta'(x, y)$ where (x, y) represents a pixel location on an image.

As used herein, the "specular reflection peak chromaticity image" refers to the color ratio at the maximum light intensity of specular reflection. By making calculations represented by the following Equations (19), a color specular reflected image can be produced based on a monochrome specular reflected image:

$$R_s(x,y) = (R_{peak}/Y_{peak}) \cdot Y_S(x,y)$$

$$B_s(x,y) = (B_{peak}/Y_{peak}) \cdot Y_S(x,y) \quad \text{Equations (19)}$$

By storing these items of information #1 to #5 separately in this manner, the amount of data to store and the amount of computation to get done can be reduced. As for Items #2 and #3, the light intensity Y could be replaced with light intensity G (=Green).

An image format including these items of information is essential pieces of information, and can be used very effectively, to introduce computer graphics processing into image processing that is applicable to various types of digital still cameras, digital movie cameras, monitor cameras and so on.

In the preferred embodiment described above, the same type of processing is supposed to be performed on each of the three primary colors. However, as a blue polarized image is generally relatively dark, a configuration for performing the processing described above on red and green images may be adopted. In that case, not only can the configuration of the apparatus be simplified but also can the processing rate be increased.

Embodiment 4

Hereinafter, a preferred embodiment of a color polarized vision camera system according to the present invention will be described with reference to FIG. 26, which illustrates a system configuration according to a fourth preferred embodiment of the present invention.

The color polarized vision camera 2301 shown in FIG. 26 is an apparatus including the color polarized image capturing section 2001 and the color polarization processing section 2000 shown in FIG. 23.

Specifically, the color polarized image capturing section 2001 is obtained by modifying the camera shown in FIG. 2 or 3 so as to shoot color images, and shoots a number N of polarized images in each of the three primary colors of red, green and blue. The color polarization processing section 2000 processes the polarized images in the three primary colors, thereby outputting the light source information 2202, the specular reflection peak chromaticity information 2203, the monochrome specular reflected image 2204, the color diffuse reflected image 2205 and the surface normal information 2206. This image format is applicable to both a moving picture and a still picture as long as the items of information shown in FIG. 25 are included.

Information 2302 about the object's refractive index may be retrieved from the object's refractive index information database 105 over the network while a shooting operation is performed with the camera 2301. Alternatively, the information 2302 may also be entered into the camera 2301 by way of a memory card 2303 that stores the information 2302 about the object's refractive index. However, the information about the object's refractive index does not have to be a refractive index itself. Optionally, by recognizing the material of the object, the camera 2301 may determine an appropriate refractive index based on the material recognized. The object's material may be selected from a group of potential materials including a plastic object, a glass object, and a ceramic, for example, by pressing a button of the camera 2301. Such material selection may be made appropriately by the user of the camera according to his or her object.

As described above, just by entering information about the refractive index at the object's surface into the color polarization vision camera of this preferred embodiment, the camera can obtain, from the shooting scene, not only information about the object's shape but also specular reflected and diffuse reflection components that have been separated from the color image and information about the direction of the light source as well. In addition, as no special light source or sensor is needed, the object can be shot in any of various types of scenes.

FIG. 27 is a perspective view illustrating an example of the color polarized image capturing section 2001, which includes a patterned polarizer 301 and a color image capture device 2504 that has a multilayer structure including a stack of a Blue layer 2501, a Green layer 2502 and a Red layer 2503.

In the patterned polarizer 301, each set of four subpixels, of which the polarization directions are defined by the four angles of orientation Ψ of 0, 45, 90 and 135 degrees of their axes of polarization, functions as a single pixel as in a Bayer array. Thus, each unit of the patterned polarizer 301 can capture four types of polarized images, of which the polarization directions are different from each other by 45 degrees, at the same time.

Such a patterned polarizer 301 may be implemented as a polarizer array that uses photonic crystals, for example (see Takashi Sato et al., Ellipsometry and Polarization Imaging Using an Array of Photonic Crystals, Material for Optamedhatronics Symposium, SenSpec 2006,—Latest Trends of Transparent Film Shape/Quality Measuring—, Jun. 8-9, 2006, Expert Committee for Mechanophotonics (The Japan Society for Precision Engineering), pp. 45-52). Also, unlike the situation where a monochrome image needs to be obtained, each pixel should represent colors. That is why the main operating wavelength range of the patterned polarizer 301 in transmitting or reflecting polarized light is supposed to agree with the wavelength range of one of the Blue, Green and Red layers 2501, 2502 and 2503 described above.

The color elements 2501, 2502 and 2503 with the multilayer structure may be implemented as "Foveon devices" that use the wavelength-dependent absorption property of silicon (see Richard F. Lyon and Paul M. Hubei: "Eyeing the Camera: Into the Next Century", IS & T/SID Tenth Color Imaging Conference, pp. 349-355, 2002).

FIG. 28 is a plan view illustrating an exemplary arrangement of subpixels A, B, C and D in the patterned polarizer 301 of the color polarized image capturing section 2001 (see FIG. 26) as shown in FIG. 27. These subpixels A, B, C and D correspond to respective portions of the polarizer, of which the directions Ψ of axes of polarization are defined by 0, 45, 90 and 135 degrees. FIG. 28 shows the relation between angles defining respective sample points on a sinusoidal wave and these subpixels A, B, C and D. The light intensity values of this sinusoidal wave are supposed to represent the light intensities of the subpixels A, B, C and D in one of the three colors of the Blue, Green and Red layers 2501, 2502 and 2503, of which the wavelength range agrees with the operating wavelength range of the patterned polarizer 301.

If the polarizer, consisting of these subpixels A, B, C and D, is arranged in the pattern 2601 shown in FIG. 28, four different pieces of polarization information can be obtained from each location of a pixel unit consisting of the four subpixels A, B, C and D. For example, four different pieces of polarization information can be obtained from either a location 2602 or from its adjacent location 2603. And at each of these locations, four subpixels A, B, C and D can form a single pixel. That is to say, since an image can be produced using lattice points, which are defined by shifting a pixel unit consisting of four subpixels A, B, C and D on a subpixel basis, the resolution of the polarized image does not decrease. Also, the color light intensity is determined by calculating the average of the light intensities that have been observed with polarization at these subpixels A, B, C and D. However, this processing can also be done while shifting the target subpixel by subpixel, and therefore, the resolution never decreases, either.

The light intensities of the four subpixels that have mutually different axes of polarization correspond to the sampled values at four points on the sinusoidal curve 2604, and therefore, can be approximated by Equation (1). However, the present inventors discovered via experiments that when a sinusoidal function was approximated and the smallest angle Ψ was determined based on information collected at four points associated with the subpixels A, B, C and D, a lot of noise was included. That is why actually sampling is preferably carried out at a greater number of points.

FIG. 29 shows a plan view of the patterned polarizer 301 of the color polarized image capturing section 2001 (see FIG. 26), which was modified so as to increase the number of sample points, and also shows those sample points on a sinusoidal wave.

In the example illustrated in FIG. 29, each unit of the polarizer that has nine different polarization axis directions Ψ of 0, 20, 40, 60, 80, 100, 120, 140 and 160 degrees is associated with a set of nine subpixels A, B, C, D, E, F, G, H and I. The light intensity values of this sinusoidal wave are supposed to represent the light intensities of the subpixels A through I in one of the three colors of the Blue, Green and Red layers 2501, 2502 and 2503, of which the wavelength range agrees with the operating wavelength range of the patterned polarizer 301.

If the polarizer, consisting of these subpixels A through I, is arranged in the pattern 2701, nine different pieces of polarization information can be obtained from either the location 2702 of a pixel unit or from the location 2703 of its adjacent pixel unit. As already described with reference to FIG. 28, since an image can be produced by shifting a pixel unit consisting of nine subpixels on a subpixel basis, the resolution of the polarized image does not decrease. In this example, since mutually different pieces of light intensity information associated with nine different axes of polarization can be obtained for each pixel unit, the number of sample points on the sinusoidal curve 2604 increases to nine and the approximation precision increases. Also, the color light intensity is determined by calculating the average of the light intensities that have been observed with polarization at these subpixels A through I. However, this processing can also be done while shifting the target subpixel by subpixel, and therefore, the resolution never decreases, either.

Embodiment 5

FIG. 30 is a block diagram illustrating a preferred embodiment in which the resolution of a color image is increased by using the image format shown in FIG. 25 and showing the detailed configuration of a color image high resolution reproduction display section 3001.

Processing of zooming in an image captured to an arbitrary size afterward (which is called "after-zooming" here in Japan) is one of the most important ones among various types of editing processing to be done after an image has been shot. In the prior art, during that after-zooming processing, the resolution of an image is increased by interpolation processing, for example. According to such a conventional method, however, when an image that has been zoomed in to a size of 2×2 or more is combined with another image, the zoomed image will often get blurred and have deteriorated image quality. In contrast, by adopting the image format of the present invention, the resolution of the image can be increased with the image quality hardly deteriorated.

The object information is entered in two separate forms as a monochrome specular reflected image 2204 and a color diffuse reflected image 2205. Generally speaking, in a specular reflected image, fine shape information is presented sharply due to the reflection of the light source but surface texture information has been lost. On the other hand, in a diffuse reflected image, the texture information has increased sharpness but the three-dimensional appearance produced by reflection of light has been lost to a certain degree this preferred embodiment, by separately processing two different types of image information in the monochrome specular reflected image 2204 and the color diffuse reflected image 2205, high-resolution processing can be carried out even more finely.

The monochrome specular reflected image 2204 is entered into a parameter estimating section 2805, while the color diffuse reflected image 2205 is entered into a pseudo-albedo image estimating section 2801.

The pseudo-albedo image estimating section 2801 estimates a pseudo-albedo image of the object based on the color diffuse reflected image 2205, the light source information 2202 and the surface normal image 2206. The pseudo-albedo image is obtained by dividing the color diffuse reflected image 2205 by cos(L, N), where (L, N) is the angle formed between the surface normal N and the light source direction vector L. If the absolute illuminance is unknown, the pseudo-albedo image can be regarded as a reflectance image unique to an object, from which the difference in illuminance due to its shape has been canceled.

The pseudo-albedo image produced by the pseudo-albedo image producing section 2801 is supplied to a pseudo-albedo image resolution increasing section 2802. The pseudo-albedo image reflects the object's own reflectance property. For that reason, the pseudo-albedo image is not affected by a variation in illumination or any other factor in an actual scene. Therefore, its resolution can be increased by using a database 2803 about the object's texton (i.e., image's texture feature quantity) that has been obtained in advance by learning. A technique for increasing the resolution using a texton is disclosed by Kamimura et al., in "Super Resolution Method using Texton Substitution", Bulletin of the Institute of Image Information and Television Engineers, Vol. 60, No. 10, pp. 1655-1657 (2006).

A diffuse reflected image resolution increasing section 2804 performs an inverse conversion from the high-resolution pseudo-albedo image that has been obtained by the pseudo-albedo image resolution increasing section 2802 into a high-resolution color diffuse reflected image. Specifically, the diffuse reflected image resolution increasing section 2804 multiplies the pseudo-albedo image by cos(L, N) mentioned above, which can be obtained based on the light source information 2202 and information about the object's high-density normal to be described later.

Next, the processing of increasing the resolution of monochrome specular reflected image 2204 will be described.

The parameter estimating section 2805 estimates parameters representing the object based on the object's normal information and the specular reflected image. Examples of models for use to estimate the parameters include Cook-Torrance model, Torrance-Sparrow model, Phong model and simplified Torrance-Sparrow model. These models are disclosed, for example, by K. Ikeuchi and K. Sato in "Determining Reflectance Properties of an Object Using Range and Brightness Images", IEEE Transactions on Pattern Analysis and Machine Intelligence, Vol. 13, No. 11, pp. 1139-1153, 1991. The parameters do not have to be estimated by this method but any other general parameter estimating method such as a gradient method or a minimum square method may also be adopted.

If the Cook-Torrance model is adopted, parameters to use will be refractive index η, roughness factor m, and EiKs, which is the product of illuminance and specular reflection ratio. As for a color image, these parameters may be obtained for each of Red, Green and Blue. However, since the monochrome specular reflected image 2204 is used in this example, a single parameter is used as a matter of principle.

To obtain a color image, Red, Green and Blue versions of the monochrome specular reflected image may be produced by multiplying the monochrome specular reflected image by a color ratio by reference to the specular reflection peak chromaticity information 2203.

A normal information density increasing section 2806 estimates high-density normal information based on a P' image and a θ' image obtained from a normal database 2807. Specifically, the normal information density increasing section 2806 increases the resolutions of the Ψ' and θ' images by the same method as the one adopted by the pseudo-albedo image resolution increasing section 2802 to increase the resolution. Before the processing of increasing the density is started, learning processing is carried out and the results of learning about the (Ψ', θ') components of the normal are stored in the normal database 2807. Alternatively, this processing can also be carried out by making an interpolation in the (Ψ', θ') space without learning. Such an interpolation is particularly effective for an object that has a smooth shape.

A specular reflected image resolution increasing section 2808 performs rendering based on the normal image with the increased density, thereby generating a synthesized high-resolution specular reflected image. In carrying out rendering, any of the models used for the parameter estimation, i.e., Cook-Torrance model, Torrance-Sparrow model, Phong model or simplified Torrance-Sparrow model, may be used.

The rendering section 2809 synthesizes together the color diffuse reflected image and the color specular reflected image with the increased resolutions, thereby generating color high-resolution image.

In the preferred embodiment described above, a method for synthesizing together the pseudo-albedo image and the specular reflected image based on the surface normal image is adopted. However, the present invention is in no way limited to that specific preferred embodiment. Alternatively, the images may also be synthesized together by subjecting the surface normal image to texture mapping processing as in ordinary computer graphics processing. In that case, when either the color diffuse reflected image or the pseudo-albedo image is extracted from the input image, its associated high-resolution texture may be retrieved from the database and the best one may be mapped.

Also, in the preferred embodiment described above, it has been described how to reproduce colors as an example. However, the present invention also covers the technique of increasing the resolution to reproduce a monochrome image. In that case, the specular reflection peak chromaticity information 2203 that is needed to produce a specular reflected image in colors is no longer necessary. Naturally, the color diffuse reflected image 2205 may be a monochrome one in that case.

Embodiment 6

FIG. 33 shows the concept of an image processing system according to the present invention.

The image processing system shown in FIG. 33 includes an image capturing section for obtaining polarized images, and a color polarization vision camera 2301 for processing the images obtained by the image capturing section. The system further includes a color high-resolution image reproducing section 3001 for processing and synthesizing together the specular and diffuse reflected images of a given object and reproducing the object image by using the image format 2201 provided by the color polarization vision camera, and a display 3301.

These components have already been described in detail, and the description thereof will be omitted herein. Such an image processing system according to the present invention can obtain a high-quality synthesized image based on a polarized image of the object.

INDUSTRIAL APPLICABILITY

An image input method and apparatus according to the present invention can obtain the object's shape in a general environment or scene and light source information in a shooting scene by a completely passive method using polarization information as long as the refractive index data of the object is known. That is why the present invention is applicable for use in various types of digital still cameras, digital movie cameras and surveillance cameras.

Also, it is expected that the smaller the sizes of cameras, the more distinct the lack of image light intensity information would be in the near future. Even so, the image input method and apparatus of the present invention can compensate for the lack of information by performing the high-resolution processing.

The invention claimed is:

1. An image processing system comprising:
    an image capturing section for obtaining, supposing an angle that defines a plane, which includes both a line connecting an imaging viewpoint and an observation point on an object together and a surface normal at the observation point, and that represents the angle of orientation of that plane around the line is identified by $\Psi$, polarized images by measuring the polarized light intensities of a light ray that is polarized parallel to the plane defined by the angle $\Psi$ for multiple different angles $\Psi$;
    an image processing section for generating an image format by processing the polarized images that have been obtained by the image capturing section, the image format including, as data, a specular reflected image and a diffuse reflected image of the object from which a light intensity image of the object that is an average light intensity value of the polarized images at the multiple angles $\Psi$ has been separated, surface normal information at respective pixel locations on the object, and light source information obtained at the object's position; and
    a high-resolution image reproducing section for reconstructing the object's shape by processing and synthesizing together the specular reflected and diffuse reflected images of the light intensity image of the object using the image format.

2. An image processing apparatus for use in the image processing system of claim 1, the apparatus comprising:
    an input section to enter the image format; and
    a high-resolution image reproducing section for reconstructing the object's shape by processing and synthesizing together the specular reflected and diffuse reflected images of the object using the image format.

3. An image processing method in relation to polarized images obtained, supposing an angle that defines a plane, which includes both a line connecting an imaging viewpoint and an observation point on an object together and a surface normal at the observation point, and that represents the angle of orientation of that plane around the line is identified by $\Psi$, by measuring the polarized light intensities of a light ray that is polarized parallel to the plane defined by the angle $\Psi$ for multiple different angles $\Psi$, the image processing method comprising the steps of:
    dividing each said a polarized image into a plurality of areas with different reflection properties including a specular reflection area and a diffuse reflection area;
    getting information about a refractive index of the object;
    drawing, as a first step of getting an estimated normal, a surface normal to the diffuse reflection area based on polarization information about the diffuse reflection area that has been obtained from the polarized image;
    drawing, as a second step of getting an estimated normal, a surface normal to the specular reflection area based on polarization information about the specular reflection area that has been obtained from the polarized image; and
    evaluating the degree of continuity between the estimated surface normals that have been drawn in the first and second steps, thereby dispelling the uncertainty of the surface normals,
    whereby the surface shape of the object is reconstructed based on the polarized image thereof.

4. An image processing method comprising the steps of:
    capturing polarized images by measuring polarized light intensities of a light ray that is polarized parallel to a plane defined by the angle $\Psi$ for multiple different angles $\Psi$, wherein each of the angles $\Psi$ defines a plane, which includes both a line connecting an imaging viewpoint and an observation point on an object together and a surface normal at the observation point, and each of the angles $\Psi$ represents the angle of orientation of that plane around the line;
    generating an image format by processing the polarized images that have been obtained by an image capturing section, the image format including, as data, a specular reflected image and a diffuse reflected image of the object from which a light intensity image of the object that is an average light intensity value of the polarized images at the multiple angles $\Psi$ has been separated, surface normal information at respective pixel locations on the object, and light source information obtained at the object's position; and
    reconstructing the object's shape by processing and synthesizing together the specular reflected and diffuse reflected images of the light intensity image of the object using the image format.

5. A non-transitory storage medium having stored therein a program which, when executed, carries out the steps recited in claim 3.

* * * * *